United States Patent
Li et al.

(10) Patent No.: US 11,693,500 B2
(45) Date of Patent: Jul. 4, 2023

(54) TOUCH DISPLAY PANEL AND DISPLAY DEVICE

(71) Applicant: Shanghai Tianma Micro-Electronics Co., Ltd., Shanghai (CN)

(72) Inventors: Zhe Li, Shanghai (CN); Feng Lu, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 0 days.

(21) Appl. No.: 17/578,246

(22) Filed: Jan. 18, 2022

(65) Prior Publication Data

US 2023/0147415 A1    May 11, 2023

(30) Foreign Application Priority Data

Nov. 5, 2021    (CN) .......................... 202111308501.2

(51) Int. Cl.
*G06F 3/044*    (2006.01)
*G06F 3/041*    (2006.01)

(52) U.S. Cl.
CPC .......... *G06F 3/0412* (2013.01); *G06F 3/0445* (2019.05); *G06F 3/0446* (2019.05); *G06F 2203/04102* (2013.01); *G06F 2203/04112* (2013.01)

(58) Field of Classification Search
CPC .................. G06F 3/0412; G06F 3/044; G06F 2203/04107; G06F 2203/04103; G06F 3/0446; G06F 3/0445; G06F 2203/04102; G06F 2203/04112; G02F 1/13338; G02F 1/133512; G02F 1/134309
See application file for complete search history.

(56) References Cited

U.S. PATENT DOCUMENTS

| | | | | |
|---|---|---|---|---|
| 2012/0327021 | A1* | 12/2012 | Ryu | ...................... G06F 3/0445 |
| | | | | 156/182 |
| 2014/0168138 | A1* | 6/2014 | Kuo | ...................... G06F 3/0446 |
| | | | | 345/174 |
| 2016/0306462 | A1* | 10/2016 | Park | ...................... G06F 3/0446 |
| 2018/0239465 | A1* | 8/2018 | Jang | ...................... G06F 3/0446 |
| 2019/0171322 | A1* | 6/2019 | Zhai | ...................... G06F 3/044 |
| 2021/0365153 | A1* | 11/2021 | Feng | ...................... G06F 3/0446 |

FOREIGN PATENT DOCUMENTS

CN                213423919 U        6/2021

* cited by examiner

*Primary Examiner* — Md Saiful A Siddiqui
(74) *Attorney, Agent, or Firm* — Anova Law Group PLLC

(57) ABSTRACT

A touch display panel and a display device are provided. The touch display panel includes a substrate, and a touch layer located on a side of the substrate. The touch layer comprises a first metal layer, an insulation layer, and a second metal layer stacked in sequence. The touch display panel also includes a plurality of touch electrodes located in the second metal layer. A touch electrode of the plurality of touch electrodes comprises a first electrode line extending along a first direction and a second electrode line extending along the second direction, and the first direction intersects the second direction. The touch display panel also includes a plurality of touch leads. The touch electrode is electrically connected to a corresponding touch lead of the plurality of touch leads. The touch lead comprises a first wiring portion extending along the first direction.

19 Claims, 33 Drawing Sheets

TOUCH DISPLAY PANEL AND DISPLAY DEVICE

CROSS-REFERENCE TO RELATED APPLICATION

This application claims priority of Chinese Patent Application No. 202111308501.2, filed on Nov. 5, 2021, the entire content of which is hereby incorporated by reference.

FIELD OF THE DISCLOSURE

The present disclosure generally relates to the field of display technology and, more particularly, relates to a touch display panel and a display device.

BACKGROUND

In existing technologies, a touch layer is usually disposed on a light-exiting surface of a display panel, such that the display panel may have a touch function. In an existing self-capacitive touch display panel, a touch layer may include touch electrodes and touch leads disposed on different metal layers. To improve conductivity and reduce production cost, the touch electrodes and the touch leads may be made of metal materials.

However, when metal materials are used to make touch electrodes and touch leads, display effect of a display device may be affected.

SUMMARY

One aspect of the present disclosure includes a touch display panel. The touch display panel includes a substrate, and a touch layer located on a side of the substrate. The touch layer comprises a first metal layer, an insulation layer, and a second metal layer stacked in sequence. The touch display panel also includes a plurality of touch electrodes located in the second metal layer. A touch electrode of the plurality of touch electrodes comprises a first electrode line extending along a first direction and a second electrode line extending along the second direction, and the first direction intersects the second direction. The touch display panel also includes a plurality of touch leads. The touch electrode is electrically connected to a corresponding touch lead of the plurality of touch leads. The touch lead comprises a first wiring portion extending along the first direction. Along a direction perpendicular to a plane where the substrate is located, the first wiring portion and the first electrode line at least partially overlap. The first wiring portion is at least partially located in the first metal layer.

Another aspect of the present disclosure includes a display device. The display device includes a touch display panel. The touch display panel includes a substrate, and a touch layer located on a side of the substrate. The touch layer comprises a first metal layer, an insulation layer, and a second metal layer stacked in sequence. The touch display panel also includes a plurality of touch electrodes located in the second metal layer. A touch electrode of the plurality of touch electrodes comprises a first electrode line extending along a first direction and a second electrode line extending along the second direction, and the first direction intersects the second direction. The touch display panel also includes a plurality of touch leads. The touch electrode is electrically connected to a corresponding touch lead of the plurality of touch leads. The touch lead comprises a first wiring portion extending along the first direction. Along a direction perpendicular to a plane where the substrate is located, the first wiring portion and the first electrode line at least partially overlap. The first wiring portion is at least partially located in the first metal layer.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In an example of an embodiment shown and discussed herein, a specific value is exemplary only, not a limitation. Accordingly, another example of the embodiment may have a different value.

Reference will now be made in detail to embodiments of the present disclosure, which are illustrated in the accompanying drawings. Wherever possible, the same reference numbers will be used throughout the drawings to refer to the same or like parts.

Figure 1:
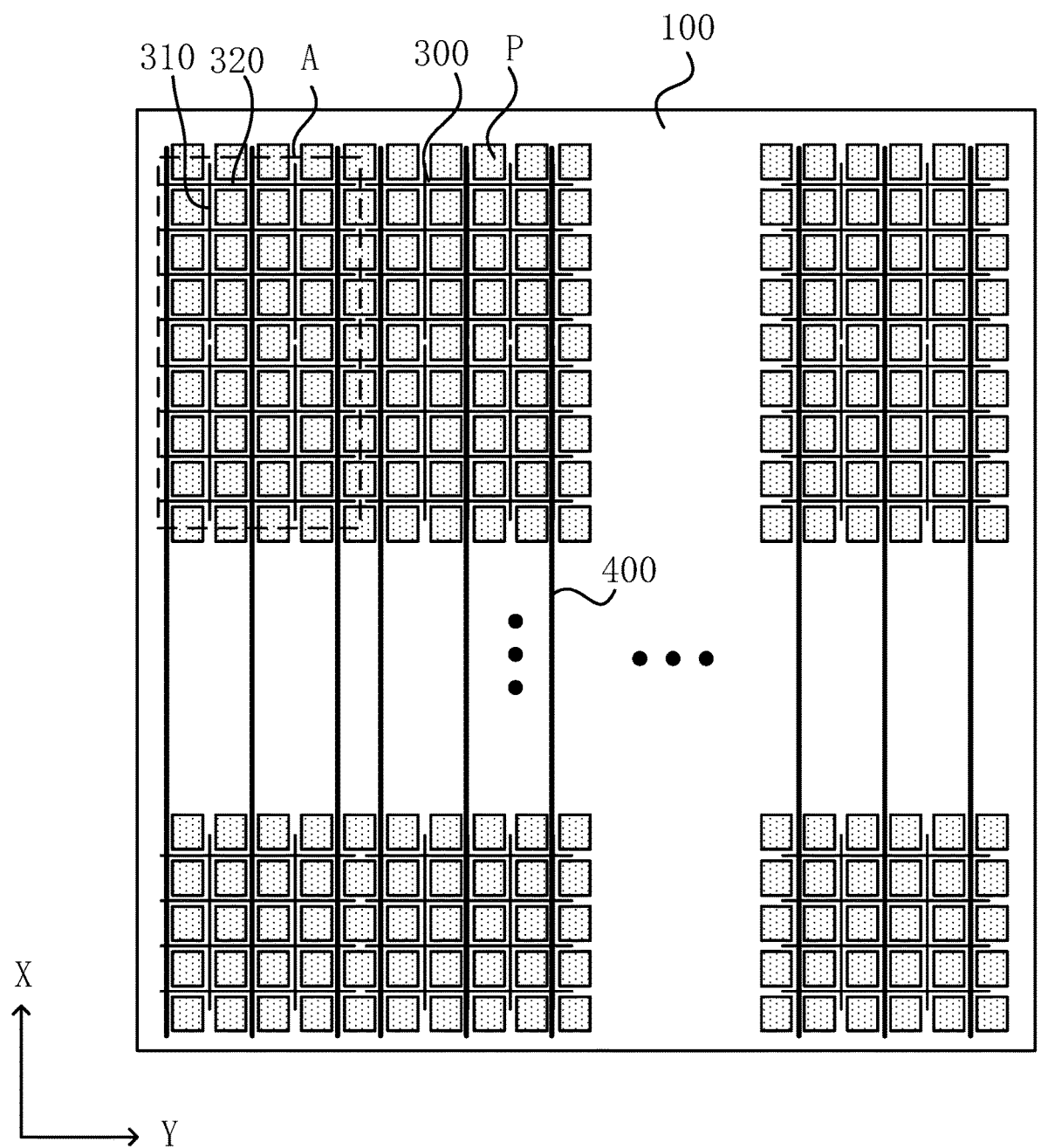
FIG. 1 illustrates a schematic top view of a touch display panel consistent with the disclosed embodiments of the present disclosure.
Figure 2:
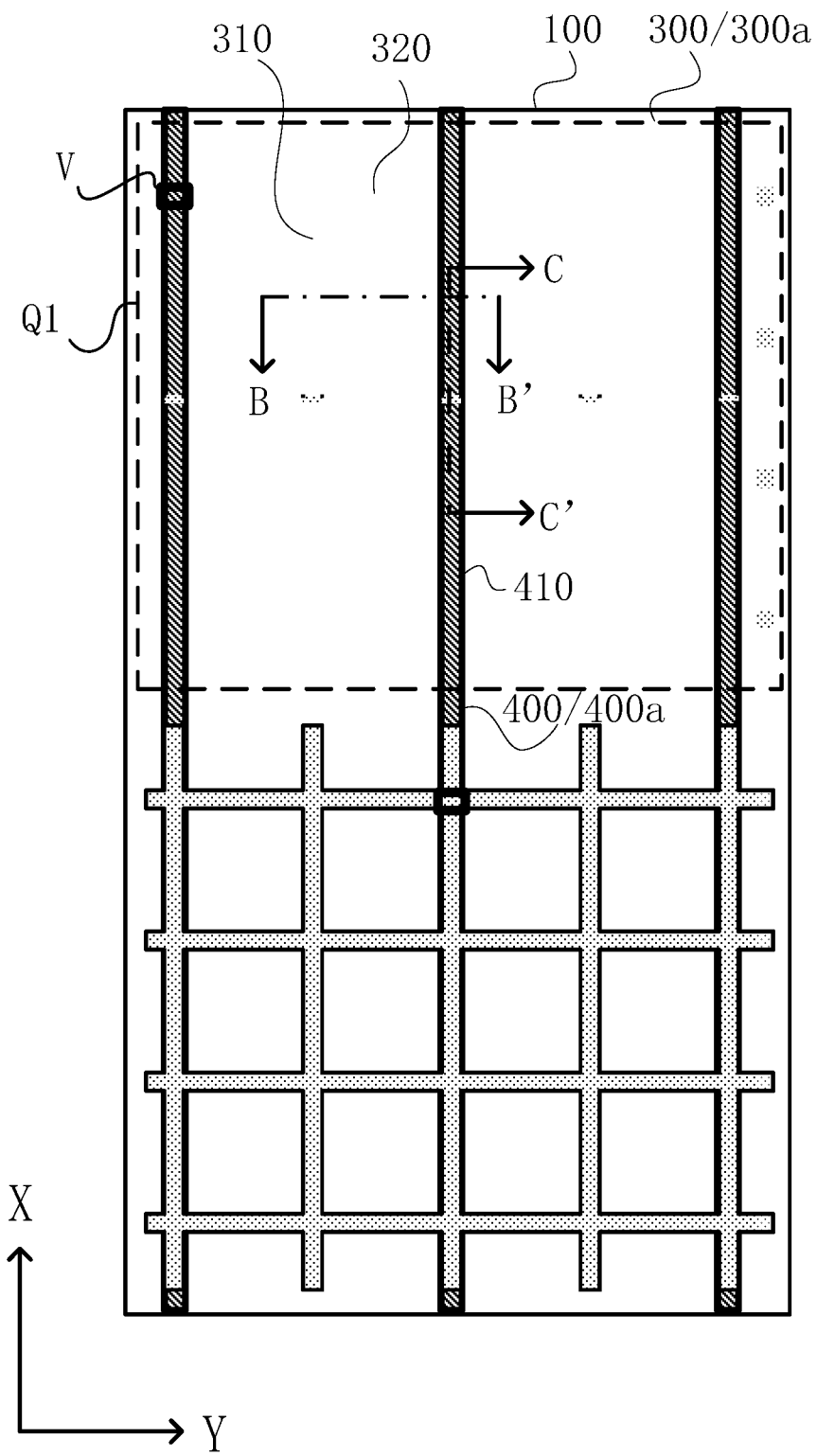
FIG. 2 illustrates an enlarged schematic diagram of part A in the touch display panel shown in FIG. 1, consistent with the disclosed embodiments of the present disclosure.
Figure 3:
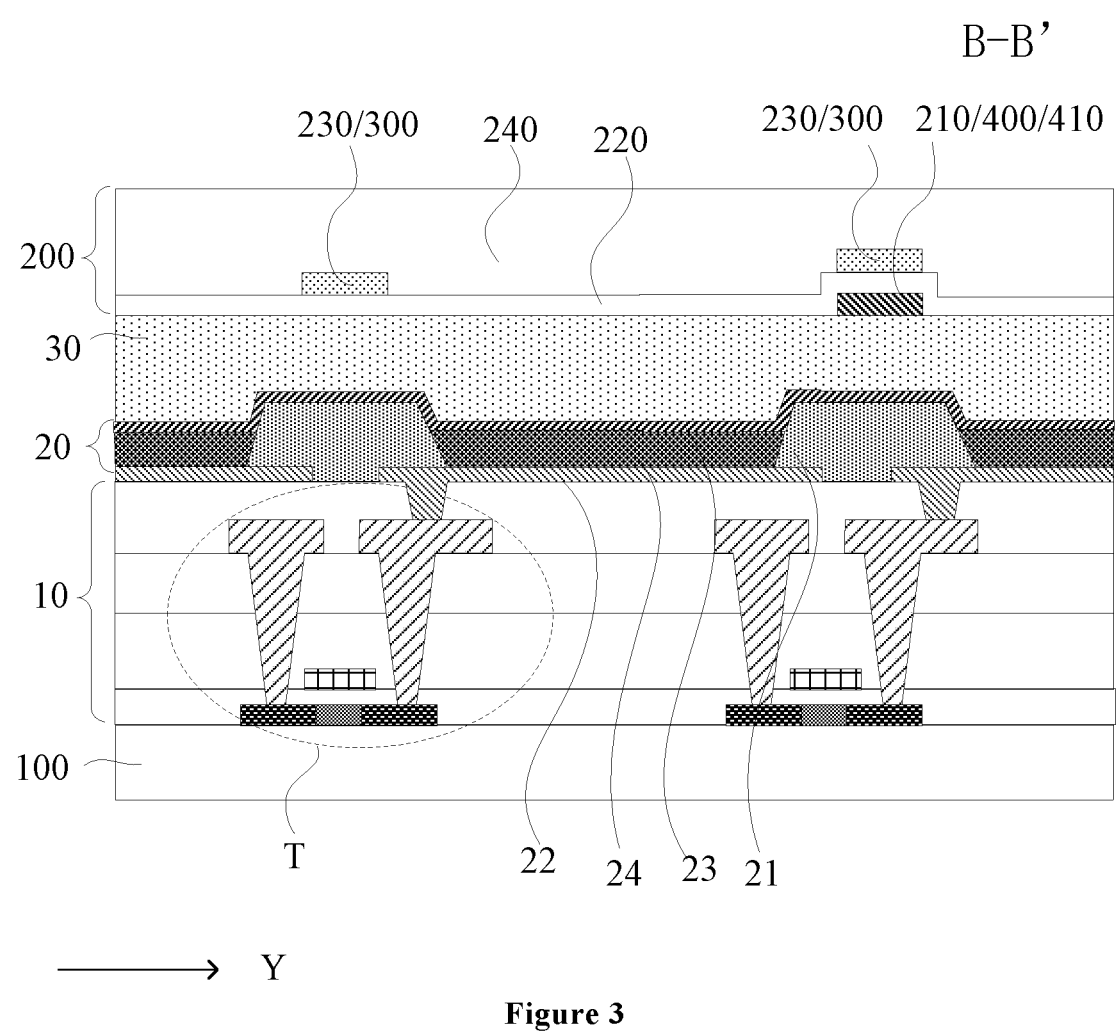
FIG. 3 illustrates a cross-sectional view along B-B' direction of the touch display panel shown in FIG. 2, consistent with the disclosed embodiments of the present disclosure.

FIG. 1 illustrates a schematic top view of a touch display panel consistent with the disclosed embodiments of the present disclosure. FIG. 2 illustrates an enlarged schematic diagram of part A in the touch display panel shown in FIG. 1. FIG. 3 illustrates a cross-sectional view along B-B' direction of the touch display panel shown in FIG. 2. A section along B-B' refers to a section in a direction parallel to a second direction and perpendicular to the substrate. With reference to FIGS. 1-3, the touch display panel may include a substrate 100. The substrate 100 may be a rigid substrate or a flexible substrate. When the substrate 100 is a rigid substrate, the substrate 100 may be a glass substrate. When the substrate 100 is a flexible substrate, the substrate 100 may be a polyimide (PI) substrate.

The touch display panel may also include a touch layer 200. The touch layer 200 is located on a side of the substrate 100. The touch layer 200 may include a first metal layer 210, an insulation layer 220, and a second metal layer 230 stacked in sequence. It should be noted that FIG. 3 exemplarily shows that, in the touch layer 200, the second metal layer 230 is located on a side of the first metal layer 210 away from the substrate 100. In some other embodiments of the present disclosure, in the touch layer 200, the first metal layer 210 may be located on a side of the second metal layer 230 away from the substrate 100. Optionally, the touch layer 200 may also include a planarization layer 240. When the second metal layer 230 in the touch layer 200 is located on the side of the first metal layer 210 away from the substrate 100, the planarization layer is located on a side of the second metal layer 230 away from the substrate 100. When the first metal layer 210 in the touch layer 200 is located on the side of the second metal layer 230 away from the substrate 100, the planarization layer is located on the side of the first metal layer 210 away from the substrate 100.

The touch display panel may also include a plurality of touch electrodes 300 and a plurality of touch leads 400. The touch electrodes 300 are insulated from each other. The touch electrode 300 is located in the second metal layer 230. In one embodiment, each of the touch leads 400 may be located in the first metal layer 210. In some other embodiments, part of the touch leads 400 is located in the first metal layer 210 and part of the touch leads 400 is located in the second metal layer 230. The touch electrodes 300 and the touch leads 400 are made of metal materials. Compared with semiconductor materials, metal materials may improve touch performance and bending performance of the touch electrodes 300 and the touch leads 400. Exemplarily, the touch electrodes 300 and the touch leads 400 may be made of materials including Cr, Ni, Cu, Al, Ag, Mo, Au, Ti, or a combination thereof. The touch electrode 300 may include a first electrode line 310 extending in a first direction X and a second electrode line 320 extending in the second direction Y. The first direction X intersects the second direction Y. Optionally, the first direction X is perpendicular to the second direction Y. The touch electrode 300 may be a grid structure formed by a plurality of the first electrode lines 310 and a plurality of the second electrode lines 320.

One touch electrode 300 corresponds to at least one touch lead 400. The touch electrode 300 is electrically connected to the touch lead 400 which the touch electrode 300 corresponds to, and the touch electrode 300 is insulated from other touch leads 400. The other touch leads 400 refer to the touch leads 400 except the touch lead 400 electrically connected to the touch electrode 300. Optionally, the touch electrode 300 and the touch lead 400 which the touch electrode 300 correspond to are electrically connected through a via V. Along a direction perpendicular to the plane where the substrate 100 is located, the via V is located at an overlap of the touch lead 400 and the touch electrode 300 electrically connected to the touch lead. Accordingly, electrical connection between the touch electrode 300 and the corresponding touch lead 400 may be achieved through the via V.

The touch lead 400 may include a first wiring portion 410 extending along the first direction X. The first electrode line 310 and the first wiring portion 410 each extend along the first direction X. The first electrode line 310 is located in the second metal layer 230, and the first wiring portion 410 is at least partially located in the first metal layer 210. Along a direction perpendicular to the plane where the substrate 100 is located, the first wiring portion 410 and the first electrode line 310 at least partially overlap. A part of the first wiring portion 410 located in the first metal layer 210 at least partially overlaps the first electrode line 310. Since the first wiring portion 410 and the first electrode line 310 at least partially overlap in the direction perpendicular to the plane where the substrate 100 is located, shielding of light exited from the touch display panel due to disposing the touch leads 400 in the touch display panel may be reduced. Accordingly, impact of deposing the touch leads on the display effect of the touch display panel may be reduced. In addition, since the touch lead 400 is made of a metal material, the touch lead may have reflective characteristics. Along the direction perpendicular to the plane where the substrate 100 is located, the first wiring portion 410 and the first electrode line 310 at least partially overlap. Accordingly, a problem of visible patterns of the touch leads 400 caused by disposing the touch leads 400 on the touch display panel may be alleviated.

It should be noted that, to clearly illustrate relationships between the touch electrodes and the touch leads in FIG. 2, components such as pixels are not shown in FIG. 2. It does not mean that the touch display panel shown in FIG. 2 does not include components such as pixels. In other embodiments of the present disclosure, schematic ways of FIG. 2 may be applied to other corresponding views.

With continuous reference to FIGS. 1 to 3, in some embodiments, the touch display panel may include an array layer 10, a light emitting layer 20, and an encapsulation layer 30, arranged in sequence. The light-emitting layer 20 is located on a side of the array layer 10 away from the substrate 100. Optionally, the array layer 10 may include a pixel circuit disposed between the substrate 100 and the light-emitting layer 20. The pixel circuit may include a thin film transistor T. The light-emitting layer 20 may include a pixel definition layer 21 and an organic light-emitting device. The organic light-emitting device may include an anode 22, a cathode 23, and an organic light-emitting material 24 located between the anode 22 and the cathode 23. The encapsulation layer 30 may include a thin-film encapsulation structure formed by alternately stacking a plurality of inorganic layers and a plurality of organic layers to encapsulate the organic light-emitting device. Exemplarily, the encapsulation layer 30 may be an encapsulation structure of an inorganic layer-organic layer-inorganic layer stack. In one embodiment, the touch layer 200 has an on-cell structure. The touch layer 200 is located on the encapsulation layer 30, that is, the touch electrodes 300 and the touch leads 400 are disposed on the encapsulation layer 30. The on-cell structure only needs to form a simple electrode pattern on the touch layer 200, and thus technical difficulty may be low, and product yield may be high. Moreover, an effective display area in the pixel display area may not be reduced, and thus the display effect of the touch display panel may not be decreased. In addition, when the touch layer 200 is disposed on the side of the packaging layer 30 away from the substrate 100, and a touch body touches the touch display panel, the touch layer 200 may be closer to the touch body. As a result, the touch electrodes 300 located in the touch layer 200 may sense touch signals more sensitively, and thus the touch sensitivity of the touch display panel may be improved.

In some other embodiments of the present disclosure, the touch layer may also be disposed on other film layers. In some other embodiments of the present disclosure, the touch layer may be disposed in other types of display panels.

Figure 4:
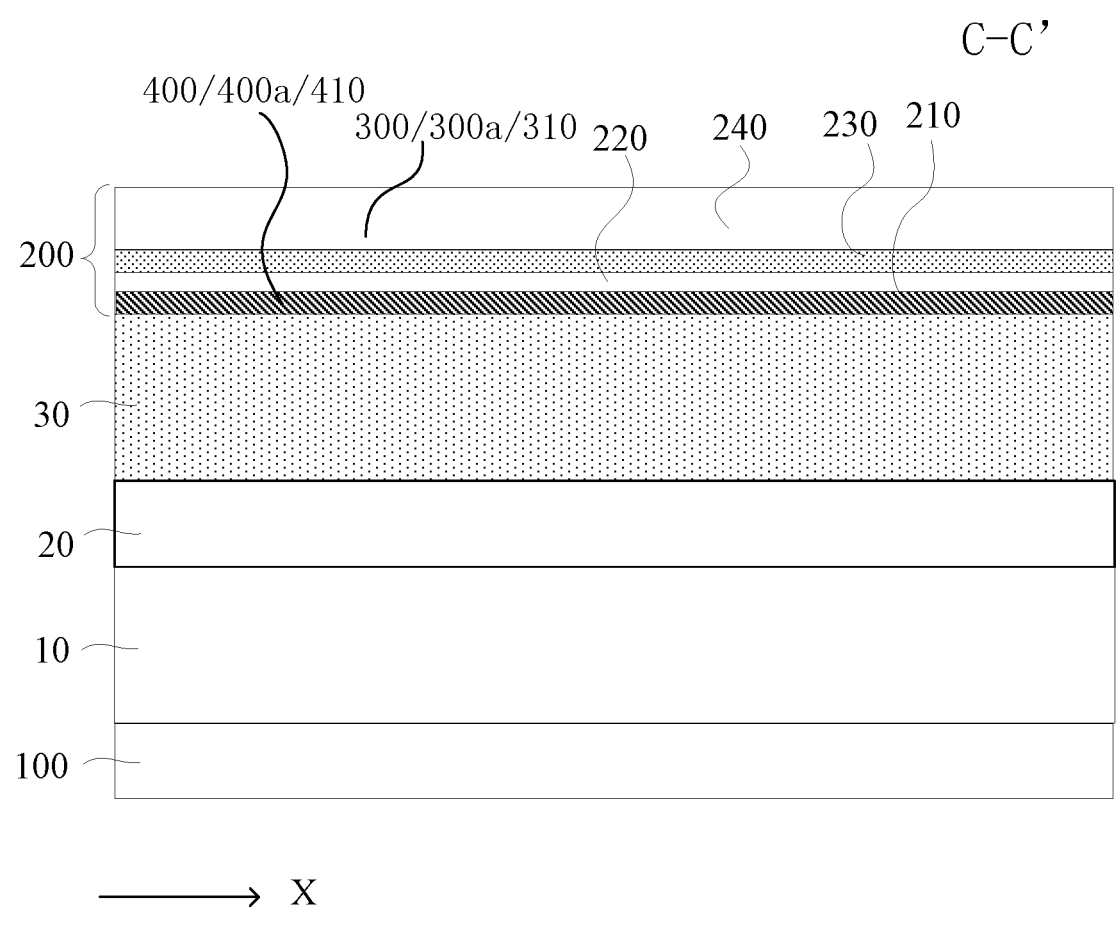
FIG. 4 illustrates a cross-sectional view along C-C' direction of the touch display panel shown in FIG. 2, consistent with the disclosed embodiments of the present disclosure.

FIG. 4 illustrates a cross-sectional view along C-C' direction of the touch display panel shown in FIG. 2. With reference to FIGS. 2 and 4, in some embodiments of the present disclosure, the touch lead 400 may include a first touch lead 400*a*. The first touch lead 400*a* is located in the first metal layer 210. The touch electrode 300 may include a first touch electrode 300*a*. The first touch electrode 300*a* is located in the second metal layer 230. The first metal layer 210 is located on a side of the insulation layer 220 close to the substrate 100. The second metal layer 230 is located on a side of the insulation layer 220 away from the substrate 100. With this configuration, when a touch body touches the touch display panel, the touch electrode 300 is closer to the touch body. Accordingly, the touch electrode 300 may sense touch signals more sensitively, and thus the touch sensitivity of the touch display panel may be improved.

An area where the first touch electrode 300*a* is located is a first area Q1. In the first area Q1, the first electrode line 310 of the first touch electrode 300*a* covers the first wiring portion 410 of the first touch lead 400*a* in a direction perpendicular to the plane where the substrate 100 is located. The first electrode line 310 of the first touch electrode 300*a* plays a role of shielding the first wiring portion 410 of the first touch lead 400*a*. As such, during touch detection, generation of a signal between the first trace portion 410 of the first touch lead 400*a* and a finger, which may cause errors in the touch detection, may be avoided. Accordingly, touch accuracy may be improved.

Figure 5:
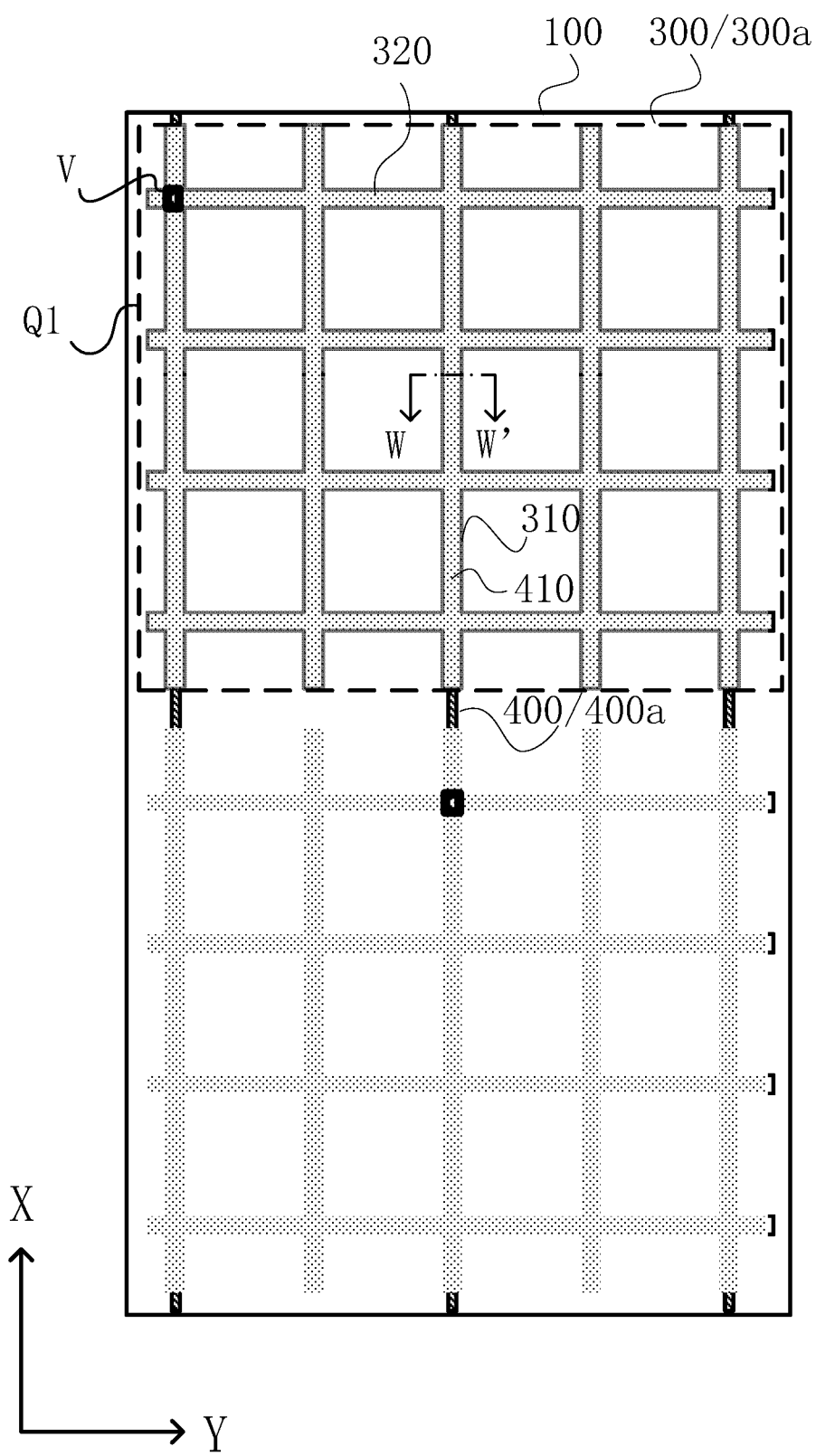
FIG. 5 illustrates another enlarged schematic diagram of part A in the touch display panel shown in FIG. 1, consistent with the disclosed embodiments of the present disclosure.
Figure 6:
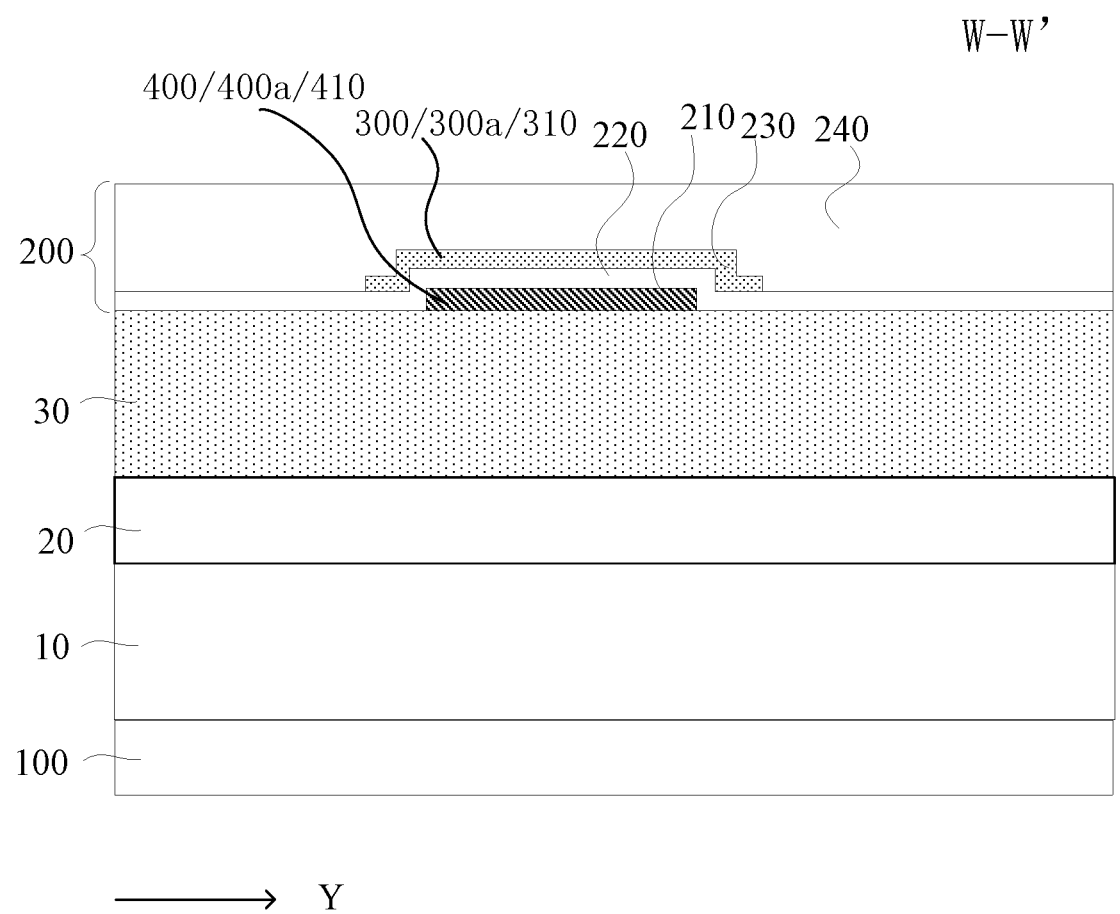
FIG. 6 illustrates a cross-sectional view along W-W' direction of the touch display panel shown in FIG. 5, consistent with the disclosed embodiments of the present disclosure.

FIG. 5 illustrates another enlarged schematic diagram of part A in the touch display panel shown in FIG. 1. FIG. 6 illustrates a cross-sectional view along W-W' direction of the touch display panel shown in FIG. 5. Optionally, a width of the first electrode line 310 of the first touch electrode 300*a* in the second direction Y is greater than a width of the first wiring portion 410 of the first touch lead 400a in the second direction Y. Accordingly, the first electrode line 310 of the first touch electrode 300a may shield the first wiring portion 410 of the first touch lead 400a.

It should be noted that, in a touch display panel provided by the present disclosure, at least one of the touch leads 400 is the first touch lead 400a. The first touch lead 400a may be any touch lead 400. In one embodiment, each of the touch leads 400 may be the first touch lead 400a. In some other embodiments of the present disclosure, part of the touch leads 400 may be the first touch leads 400a, and other types of touch leads 400 may also exist in the touch display panel.

Similarly, in the touch display panel provided by the present disclosure, at least one of the touch electrodes 300 is the first touch electrode 300a, and the first touch electrode 300a may be any touch electrode 300. In one embodiment, each of the touch electrodes 300 may be the first touch electrode 300a. In some other embodiments of the present disclosure, part of the touch electrodes 300 may be the first touch electrodes 300a, and other types of touch electrodes 300 may also exist in the touch display panel. Exemplarily, the touch electrodes 300 arranged in a row direction may be set as the first touch electrodes 300a, and the touch electrodes 300 arranged in a column direction may also be set as the first touch electrodes 300a.

Figure 7:
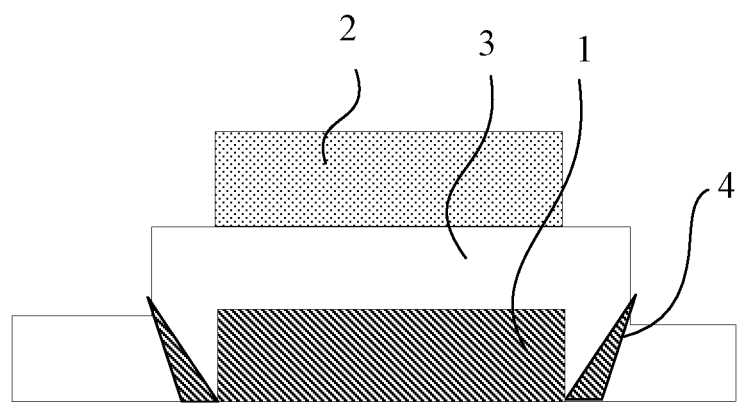
FIG. 7 illustrates a partial cross-sectional view of a touch layer in a touch display panel, consistent with the disclosed embodiments of the present disclosure.

FIG. 7 illustrates a partial cross-sectional view of a touch layer in a touch display panel. Referring to FIG. 7, in the display panel, in the direction perpendicular to the plane where the display panel is located, when the metal line 1 and the metal line 2 in metal layers of two adjacent layers at least partially overlap, due to manufacturing techniques, a metal puncture problem may occur at an overlap place. The metal wire 1 may be made first, and the metal wire 2 is made subsequently. When the metal wire 1 is made, an edge of the metal wire 1 may have a thorn-like structure 4 because of an etching process. The thorn-like structure 4 may pierce the insulation layer between two adjacent metal layers, resulting in a short circuit between the layer metal line 1 and the layer metal line 2. Further, after the metal wire 1 is made, the boundary position of the metal wire 1 may have a stepped structure. Along the direction perpendicular to the plane where the display panel is located, the metal wires 1 and the metal wires 2 in the metal layers of two adjacent layers at least partially overlap. When the metal wire 2 needs to be fabricated above the stepped structure subsequently, in an exposure process for the fabrication of the metal wire 2, since the boundary position of the metal wire 1 has a stepped structure, the photoresist may flow into the junction of the height difference of the insulation layer. Accordingly, metal etching residue may occur in the junction, increasing a risk of a short circuit between the metal wire 1 and the metal wire 2. Further, along the direction perpendicular to the plane where the display panel is located, the more the overlap area of the metal wire 1 and the metal wire 2 in the metal layers of two adjacent layers, the greater the risk of a short circuit between the metal wire 1 and the metal wire 2 is.

With reference to FIGS. 1 to 3, in a touch display panel provided by the present disclosure, the first electrode line 310 in the touch electrode 300 and the first wiring portion 410 in the touch lead 400 each extend along the first direction X. The first electrode line 310 is located in the second metal layer 230. The first wiring portion 410 is at least partially located in the first metal layer 210. Along the direction perpendicular to the plane where the substrate 100 is located, the first wiring portion 410 and the first electrode line 310 at least partially overlap. The larger the overlap area between the vertical projection of the first wiring portion 410 on the plane where the substrate 100 is located and the vertical projection of the first electrode line 310 on the plane where the substrate 100 is located, the greater the risk of a short circuit between the first wiring portion 410 and the first electrode line 310, and thus the greater the risk of a short circuit between the touch electrodes 300 and the touch leads 400 that are insulated from each other.

Based on the above research, the present disclosure provides a touch display panel. Some embodiments of the touch display panel provided by the present disclosure are described below.

Figure 8:
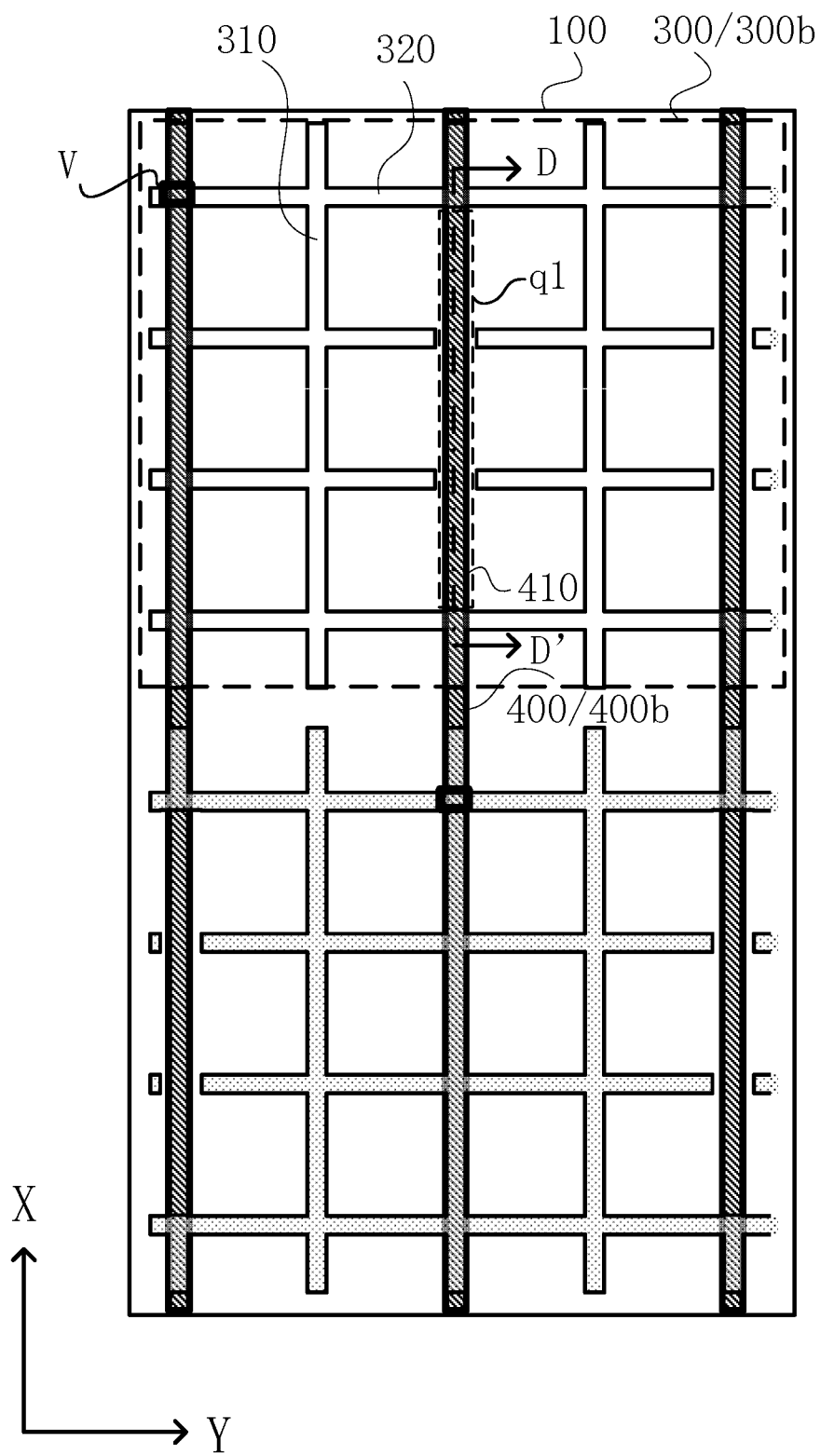
FIG. 8 illustrates another enlarged schematic diagram of part A in the touch display panel shown in FIG. 1, consistent with the disclosed embodiments of the present disclosure.
Figure 9:
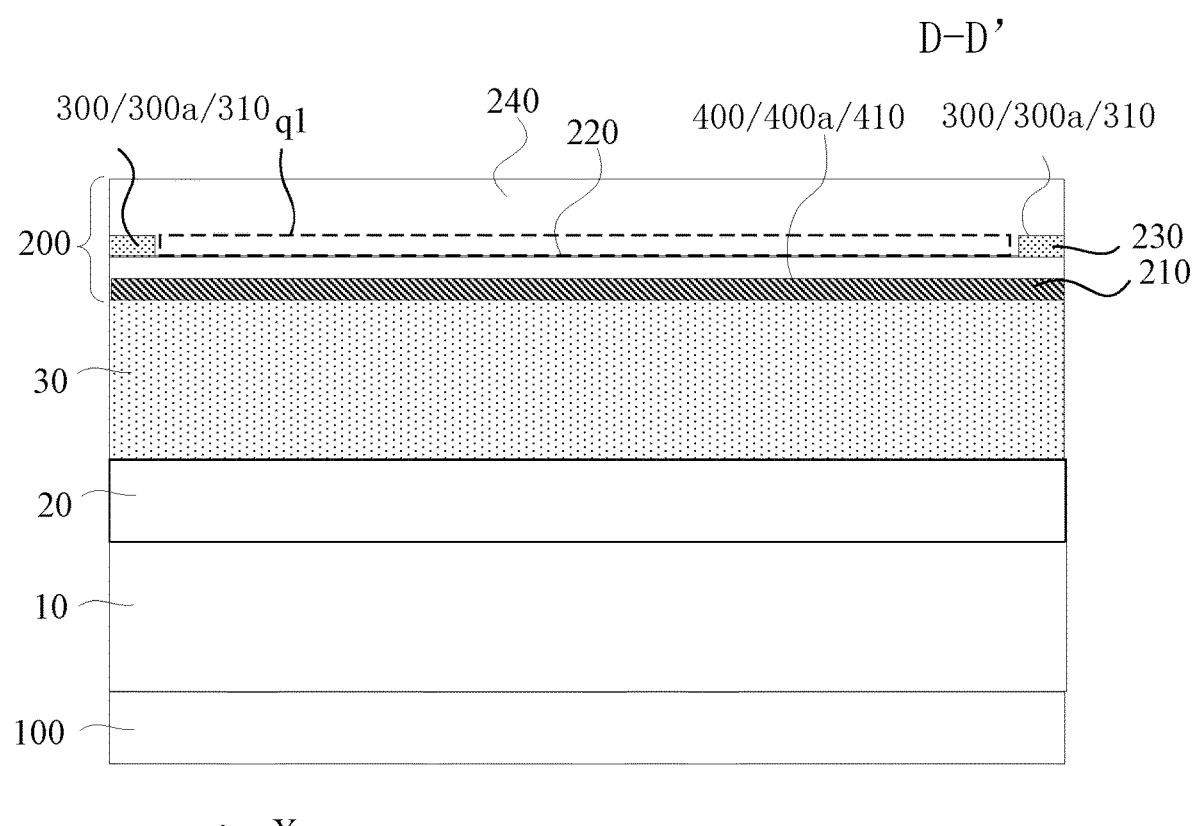
FIG. 9 illustrates a cross-sectional view along D-D' direction of the touch display panel shown in FIG. 8, consistent with the disclosed embodiments of the present disclosure.

FIG. 8 illustrates another enlarged schematic diagram of part A in a touch display panel shown in FIG. 1. FIG. 9 illustrates a cross-sectional view along D-D' direction of the touch display panel shown in FIG. 8. With reference to FIGS. 8 and 9, in some embodiments, the touch lead 400 may include a second touch lead 400b. The second touch lead 400b is located in the first metal layer 210. The touch electrode 300 may include a second touch electrode 300b. The second touch electrode 300b is located in the second metal layer 230. Optionally, the second touch lead 400b and the second touch electrode 300b are insulated from each other.

One second touch electrode 300b may include at least two adjacent first electrode lines 310 arranged along the first direction X, and a first interval q1 is located between the two adjacent first electrode lines 310. Along the direction perpendicular to the plane where the substrate 100 is located, the first wiring portion 410 of the second touch lead 400b overlaps the first interval q1. That is, the first electrode line 310 is not disposed at an area corresponding to the first interval q1 in the touch display panel, and only the first wiring portion 410 of the second touch lead 400b is provided in this area. As such, an overlap area of the vertical projection of the first wiring portion 410 on the plane where the substrate 100 is located and the vertical projection of the first electrode line 310 on the plane where the substrate 100 is located may be reduced. Accordingly, the risk of a short circuit between the first wiring portion 410 and the first electrode line 310 may be reduced, and the risk of a short circuit between the touch electrode 300 and the touch lead 400 that are insulated from each other may be reduced.

It should be noted that the two adjacent first electrode lines 310 arranged along the first direction X means that there is no other first electrode line 310 between the two first electrode lines 310 arranged along the first direction X.

Optionally, in the touch electrodes 300 and the touch leads 400 that are electrically connected to each other, there is no need to reduce the overlap area between the vertical projection of the first wiring portion 410 on the plane where the substrate 100 is located and the vertical projection of the first electrode line 310 on the plane where the substrate 100 is located.

It should be noted that, in a touch display panel provided by the present disclosure, at least one of the touch leads 400 is the first touch lead 400a. The first touch lead 400 a may be any touch lead 400. In one embodiment, each of the touch leads 400 may be the first touch lead 400a. In some other embodiments of the present disclosure, part of the touch leads 400 may be the first touch leads 400a, and other types of touch leads 400 may also exist in the touch display panel.

Similarly, in a touch display panel provided by the present disclosure, at least one of the touch electrodes 300 is the first touch electrode 300a, and the first touch electrode 300a may be any touch electrode 300. In one embodiment, each of the touch electrodes 300 may be the first touch electrode 300a.

In some other embodiments of the present disclosure, part of the touch electrodes 300 may be the first touch electrodes 300a, and other types of touch electrodes 300 may also exist in the touch display panel. Exemplarily, the touch electrodes 300 arranged in a row direction may be set as the first touch electrodes 300a, and the touch electrodes 300 arranged in a column direction may also be set as the first touch electrodes 300a.

Figure 10:
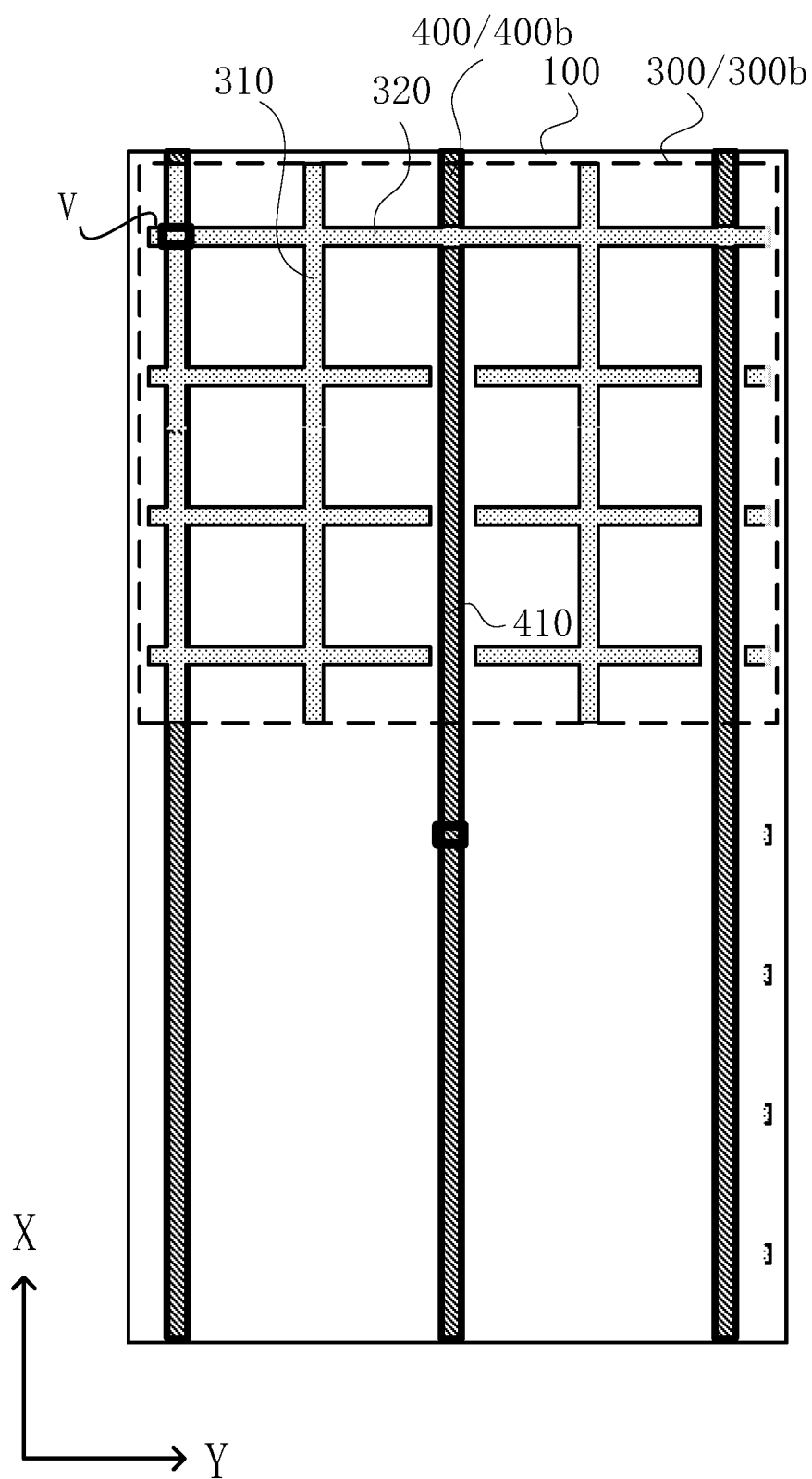
FIG. 10 illustrates another enlarged schematic diagram of part A in the touch display panel shown in FIG. 1, consistent with the disclosed embodiments of the present disclosure.

FIG. 10 illustrates another enlarged schematic diagram of part A in the touch display panel shown in FIG. 1. With reference to FIG. 10, optionally, in one second touch electrode 300b, in the direction perpendicular to the plane where the substrate 100 is located, part of the first wiring portions 410 only overlaps an intersection region of the first electrode line 310 and the second electrode line 320. Thus, the overlap area between the vertical projection of the first wiring portion 410 on the plane where the substrate 100 is located and the vertical projection of the first electrode line 310 on the plane where the substrate 100 is located may be further reduced. Accordingly, the risk of a short circuit between the first wiring portion 410 and the first electrode line 310 may be reduced, and the risk of a short circuit between the touch electrode 300 and the touch lead 400 that are insulated from each other may be reduced.

Figure 11:
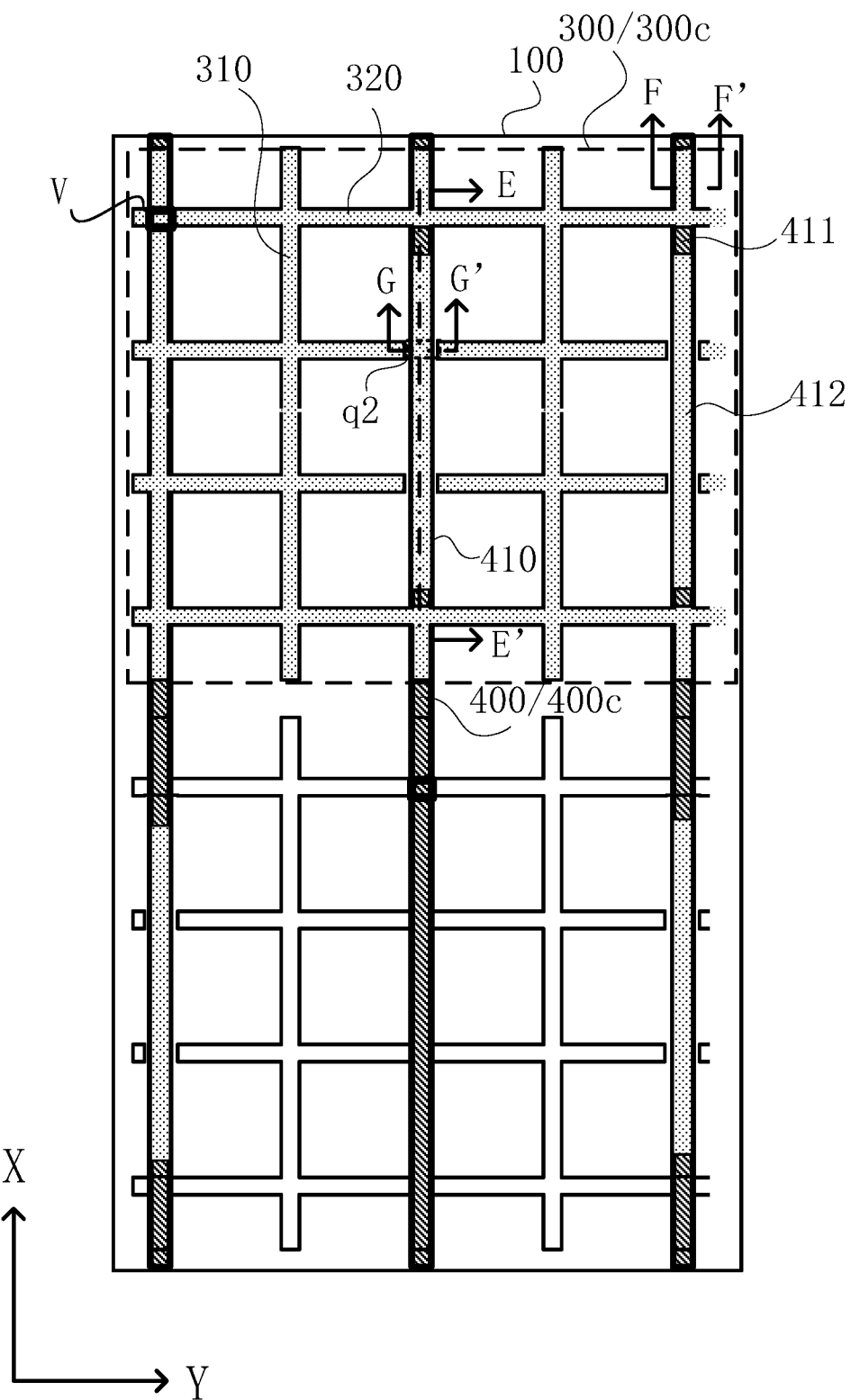
FIG. 11 illustrates another enlarged schematic diagram of part A in the touch display panel shown in FIG. 1, consistent with the disclosed embodiments of the present disclosure.
Figure 12:
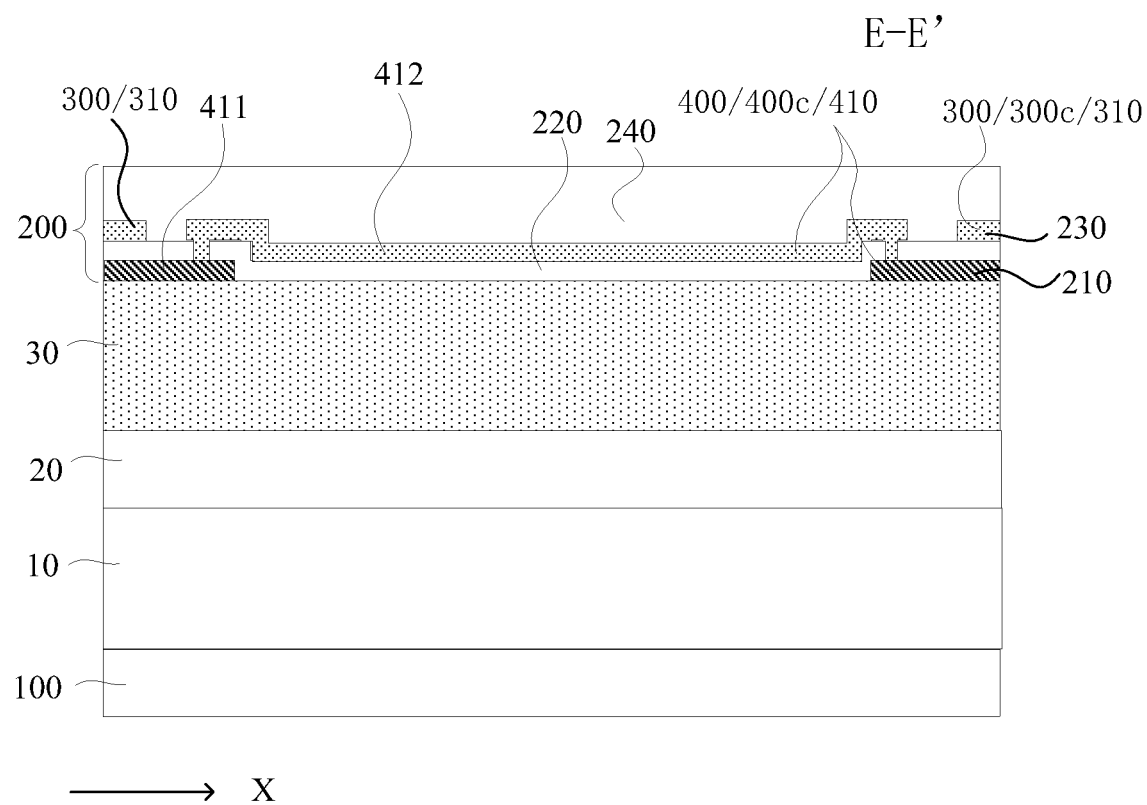
FIG. 12 illustrates a cross-sectional view along E-E' direction of the touch display panel shown in FIG. 11, consistent with the disclosed embodiments of the present disclosure.

FIG. 11 illustrates another enlarged schematic diagram of part A in the touch display panel shown in FIG. 1. FIG. 12 illustrates a cross-sectional view along E-E' direction of the touch display panel shown in FIG. 11. With reference to FIGS. 11 and 12, in some embodiments, the touch lead 400 may include a third touch lead 400c. The third touch lead 400c and touch electrodes 300 other than the touch electrode 300 electrically connected to the third touch lead 400c are insulated from each other. The first wiring portion 410 of the third touch lead 400c is partially located in the second metal layer 230. In an area corresponding to the touch electrode 300 insulated from the third touch lead 400c, since the first wiring portion 410 in the third touch lead 400c is partially located in the second metal layer 230, the area where the first wiring portion 410 is located in the second metal layer 230 may not be disposed with the first electrode line 310. That is, along the direction perpendicular to the plane where the substrate 100 is located, the part of the first wiring portion 410 located in the second metal layer 230 does not overlap the first electrode line 310. Thus, the overlap area between the vertical projection of the first wiring portion 410 on the plane where the substrate 100 is located and the vertical projection of the first electrode line 310 on the plane where the substrate 100 is located may be reduced. Accordingly, the risk of a short circuit between the first wiring portion 410 and the first electrode line 310 may be reduced, and the risk of a short circuit between the touch electrode 300 and the touch lead 400 that are insulated from each other may be reduced.

It should be noted that, in a touch display panel provided by the present disclosure, at least one touch lead 400 is the third touch lead 400c. The third touch lead 400c may be any touch lead 400. In one embodiment, each of the touch leads 400 may be the third touch lead 400c. In some other embodiments of the present disclosure, part of the touch leads 400 may be the third touch leads 400c, and other types of touch leads 400 may also exist in the touch display panel.

It should be noted that, in the third touch leads 400c, one section of the lead may be located in the second metal layer 230, or a plurality of sections of the lead may be located in the second metal layer 230.

Figure 13:
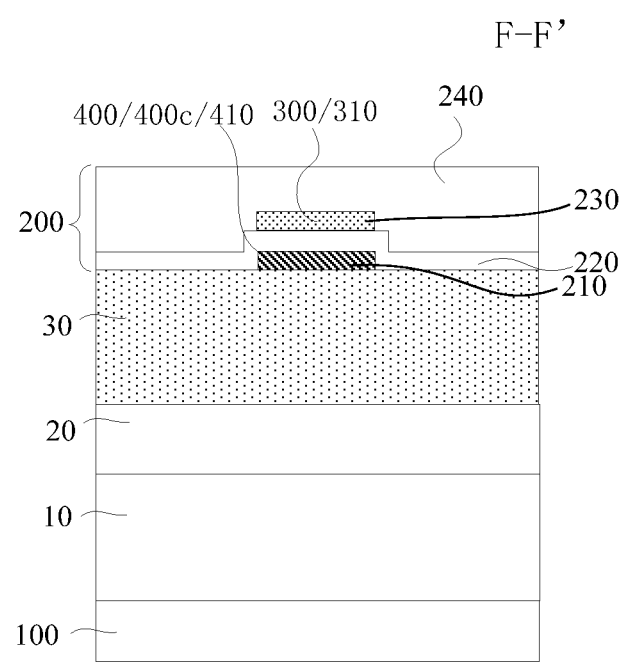
FIG. 13 illustrates a cross-sectional view along F-F' direction of the touch display panel shown in FIG. 11, consistent with the disclosed embodiments of the present disclosure.

FIG. 13 illustrates a cross-sectional view along F-F' direction of the touch display panel shown in FIG. 11. With reference to FIGS. 11 and 13, in some embodiments, the width of the touch lead 400 in the second direction Y is approximately equal to the width of the first electrode line 310 in the second direction Y. Along the direction perpendicular to the plane where the substrate 100 is located, a first wiring portion 410 in the touch lead 400 and the first electrode line 310 at least partially overlap. Accordingly, influence of the increase of the reflective area caused by disposing the touch lead 400 may be decreased, and a problem of visible patterns of the touch leads 400 caused by disposing the touch leads 400 on the touch display panel may be alleviated.

Figure 14:
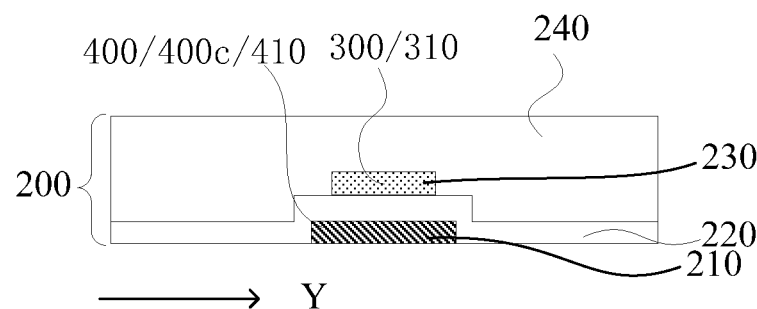
FIG. 14 illustrates a partial schematic diagram of a touch layer in a touch display panel consistent with the disclosed embodiments of the present disclosure.

It should be noted that FIGS. 11 and 13 exemplarily show that the width of the touch lead 400 in the second direction Y may be approximately equal to the width of the first electrode line 310 in the second direction Y. FIG. 14 illustrates a partial schematic diagram of a touch layer in a touch display panel consistent with the disclosed embodiments of the present disclosure. As shown in FIG. 14, optionally, the first metal layer 210 is located on a side of the insulation layer 220 close to the substrate, and the touch electrode 300 is located on a side of the touch lead 400 away from the substrate. The width of the touch lead 400 in the second direction Y may be greater than the width of the first electrode line 310 in the touch electrode 300 in the second direction Y. Even though the edge of the touch lead 400 may include a thorn-like structure due to the etching residue, when the thorn-like structure pierces the insulation layer 220, since the width of the touch lead 400 is greater than the width of the first electrode line 310 in the touch electrode 300, a certain distance between the thorn-like structure at the edge of the touch lead 400 and the first electrode line 310 may exist. Accordingly, the risk of metal puncture between the first wiring portion 410 and the first electrode line 310 may be reduced, and the risk of a short circuit between the touch electrode 300 and the touch lead 400 that are insulated from each other may be reduced. Further, after the first wiring portion 410 is manufactured, the boundary of the first wiring portion 410 may include a stepped structure. To subsequently fabricate the first electrode line 310 on the stepped structure, in a photolithography process, a photoresist needs to be coated on a region of the second metal layer 230 where the first electrode line 310 is formed. Since the width of the first electrode line 310 in the second direction Y may be smaller than the width of the first wiring portion 410 in the second direction Y, a distance between the coating position of the photoresist and the height-difference junction of the insulation layer 220 may exist. Accordingly, the photoresist may be prevented from flowing into the height-difference junction of the insulation layer 220. As such, occurrence of metal etching residue at the height-difference junction may be avoided. Accordingly, risk of a short circuit between the touch electrode 300 and the touch lead 400 that are insulated from each other may be reduced, and risk of a short circuit between two adjacent touch electrodes may be reduced.

Figure 15:
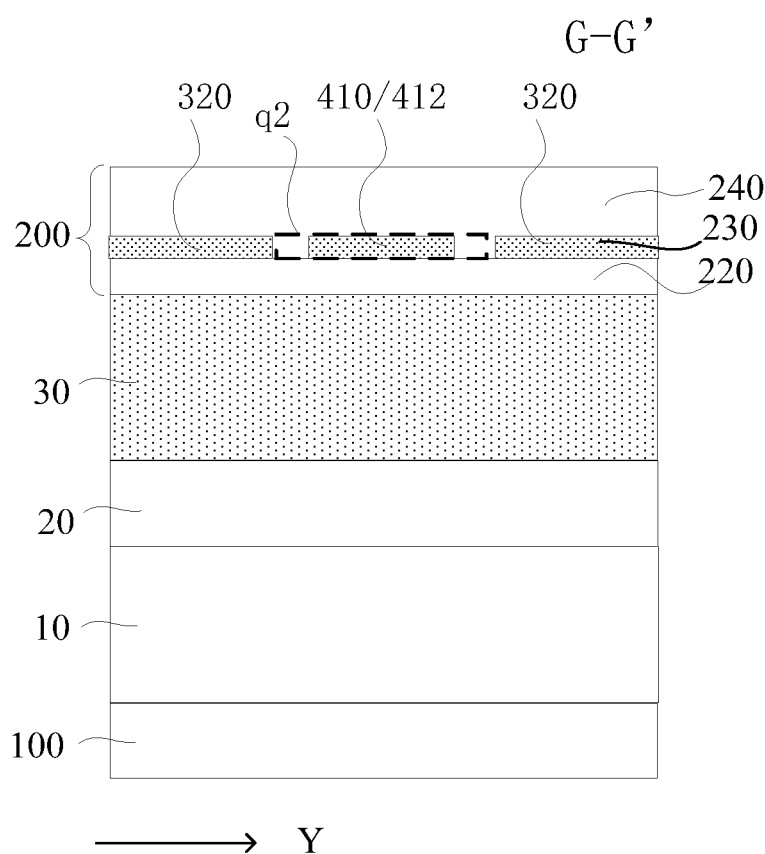
FIG. 15 illustrates a cross-sectional view along G-G' direction of the touch display panel shown in FIG. 11, consistent with the disclosed embodiments of the present disclosure.

FIG. 15 illustrates a cross-sectional view along G-G' direction of the touch display panel shown in FIG. 11. With reference to FIGS. 11, 12 and 15, in some embodiments, the first wiring portion 410 in the third touch lead 400c may include a first sub-portion 411 and a second sub-portion 412 that are electrically connected. The first sub-portion 411 is located in the first metal layer 210, and the second sub-portion 412 is located in the second metal layer 230.

The touch electrode 300 may include a third touch electrode 300c. One third touch electrode 300c may include at least two adjacent second electrode lines 320 arranged along the second direction Y. A second interval q2 may be located between the two adjacent second electrode lines 320. Along the direction perpendicular to the plane where the substrate 100 is located, the second sub-portion 412 overlaps the second interval q2. The second sub-portion 412 extends through the second interval q2, and the second sub-portion 412 and the third touch electrode 300c do not overlap. In this way, the second sub-portion 412 in the first wiring portion 410 of the third touch lead 400c may be located in the second metal layer 230, and meanwhile, the third touch lead 400c may be insulated from a part of the third touch electrode 300c.

The first sub-portion 411 in the first wiring portion 410 of the third touch lead 400c is located in the first metal layer 210. Along the direction perpendicular to the plane where the substrate 100 is located, the third touch electrode 300c partially overlaps the first sub-portion 411. Accordingly, signal transmission between each electrode line in the third touch electrode 300c may be realized.

It should be noted that the two adjacent second electrode lines 320 arranged along the second direction Y means that there is no other second electrode line 320 between the two second electrode lines 320 arranged along the second direction Y.

It should be noted that, in the first wiring portion 410 of the third touch lead 400c, numbers of the first sub-portion 411 and the second sub-portion 412 may be set according to actual production requirements.

It should be noted that, in a touch display panel provided by the present disclosure, at least one touch electrode 300 may be the third touch electrode 300c. The third touch electrode 300c may be any touch electrode 300. In one embodiment, each of the touch electrodes 300 may be the third touch electrodes 300c. In some other embodiments of the present disclosure, part of the touch electrodes 300 may be the third touch electrodes 300c, and other types of touch electrodes 300 may also exist in the touch display panel. Exemplarily, the touch electrodes 300 arranged in a row direction may be set as the third touch electrodes 300c, and the touch electrodes 300 arranged in a column direction may also set as the third touch electrodes 300c.

Figure 16:
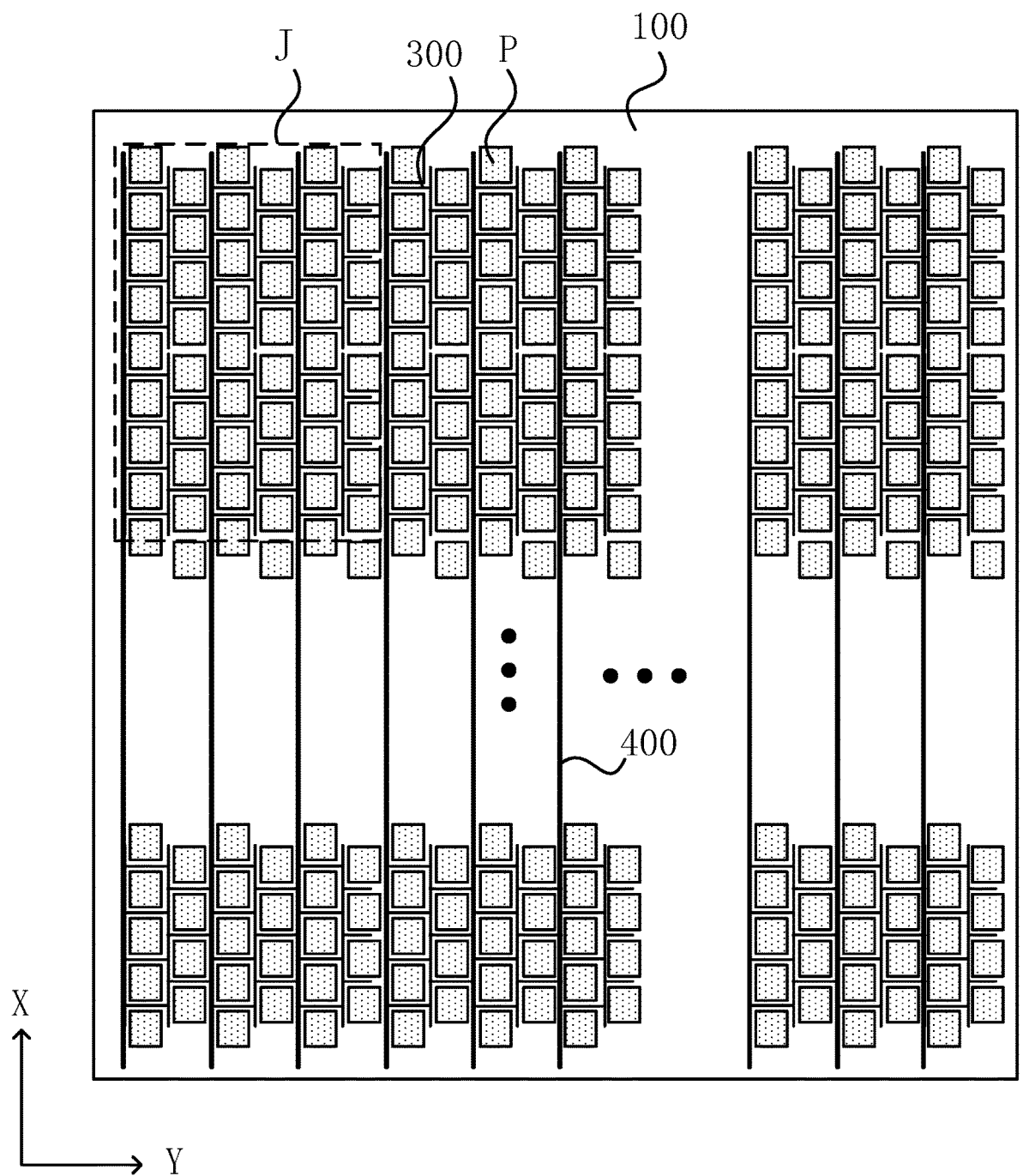
FIG. 16 illustrates a schematic top view of another touch display panel consistent with the disclosed embodiments of the present disclosure.
Figure 17:
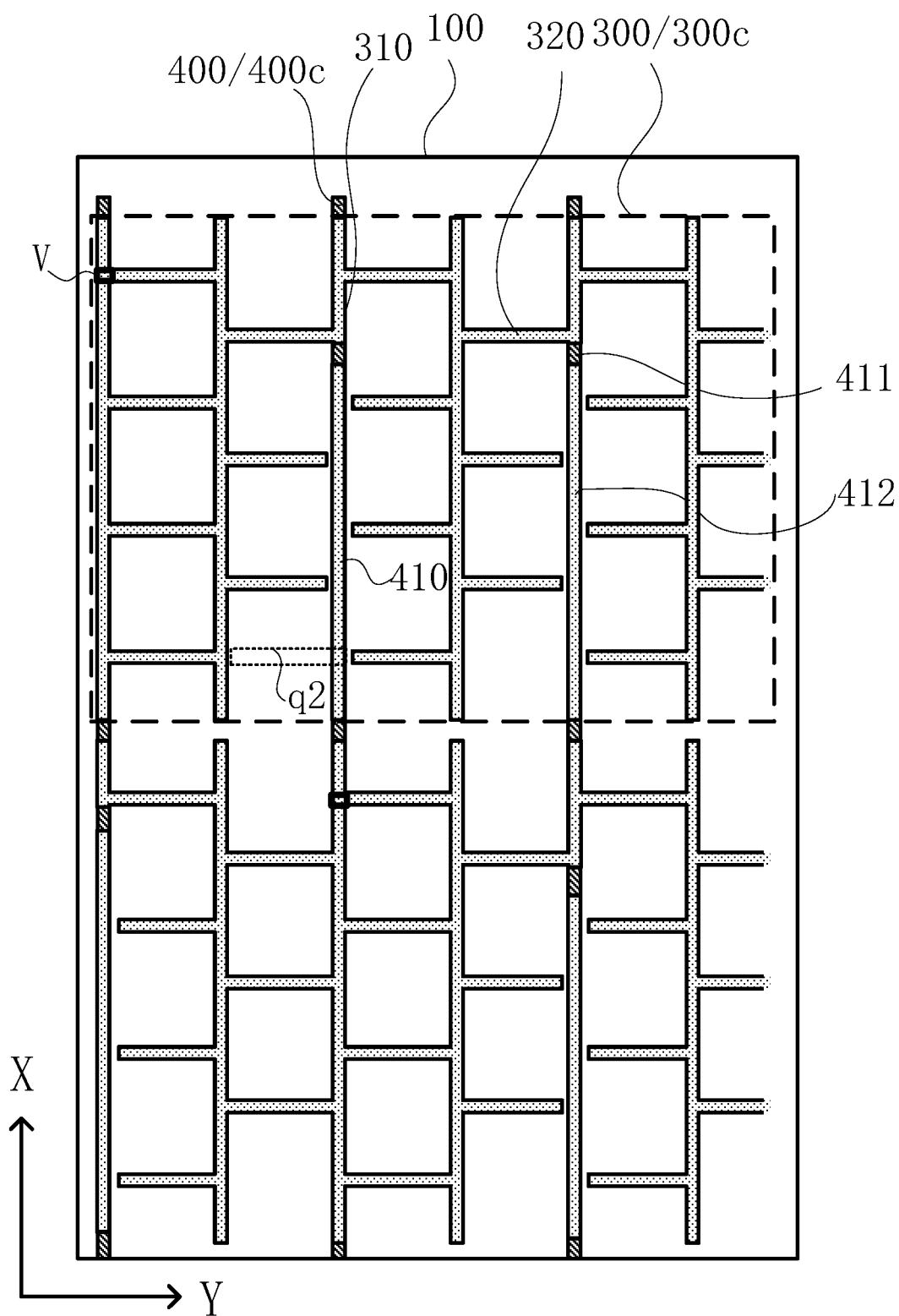
FIG. 17 illustrates an enlarged schematic diagram of part J in the touch display panel shown in FIG. 16, consistent with the disclosed embodiments of the present disclosure.

It should be noted that FIG. 11 exemplarily shows structures of the third touch electrode 300c and the third touch lead 400c in the touch display panel. In some other embodiments of the present disclosure, the third touch electrode 300c and the third touch lead 400c in other types of touch display panels may have similar configurations. FIG. 16 illustrates a schematic top view of another touch display panel. FIG. 17 illustrates an enlarged schematic diagram of part J in a touch display panel shown in FIG. 16. With reference to FIGS. 16 and 17, in some embodiments, the first wiring portion 410 in the third touch lead 400c may include a first sub-portion 411 and a second sub-portion 412 that are electrically connected. The first sub-portion 411 is located in the first metal layer 210, and the second sub-portion 412 is located in the second metal layer 230. The touch electrode 300 may include a third touch electrode 300c. One third touch electrode 300c may include at least two adjacent second electrode lines 320 arranged along the second direction Y. A second interval q2 may be located between the two adjacent second electrode lines 320. Along the direction perpendicular to the plane where the substrate 100 is located, the second sub-portion 412 overlaps the second interval q2. The second sub-portion 412 extends through the second interval q2, and the second sub-portion 412 and the third touch electrode 300c do not overlap. In this way, the second sub-portion 412 in the first wiring portion 410 of the third touch lead 400c may be located in the second metal layer 230, and meanwhile, the third touch lead 400c may be insulated from a part of the third touch electrode 300c. The first sub-portion 411 in the first wiring portion 410 of the third touch lead 400c is located in the first metal layer 210. Along the direction perpendicular to the plane where the substrate 100 is located, the third touch electrode 300c partially overlaps the first sub-portion 411. Accordingly, signal transmission between each electrode line in the third touch electrode 300c may be realized.

In some embodiments, along the direction perpendicular to the plane where the substrate is located, in at least one third touch electrode, only one electrode line overlaps the first sub-portion.

With continuous reference to FIG. 17, along the direction perpendicular to the plane where the substrate 100 is located, in at least one third touch electrode 300c, only one first electrode line 310 overlaps the first sub-portion 411. The first electrode line 310 is only connected to two second electrode lines 320. Accordingly, the overlap area of the vertical projection of the first wiring portion 410 on the plane where the substrate 100 is located and the vertical projection of the first electrode line 310 on the plane where the substrate 100 is located may be minimized, and meanwhile, signal transmission between each electrode line in the third touch electrode 300c may be realized.

Figure 18:
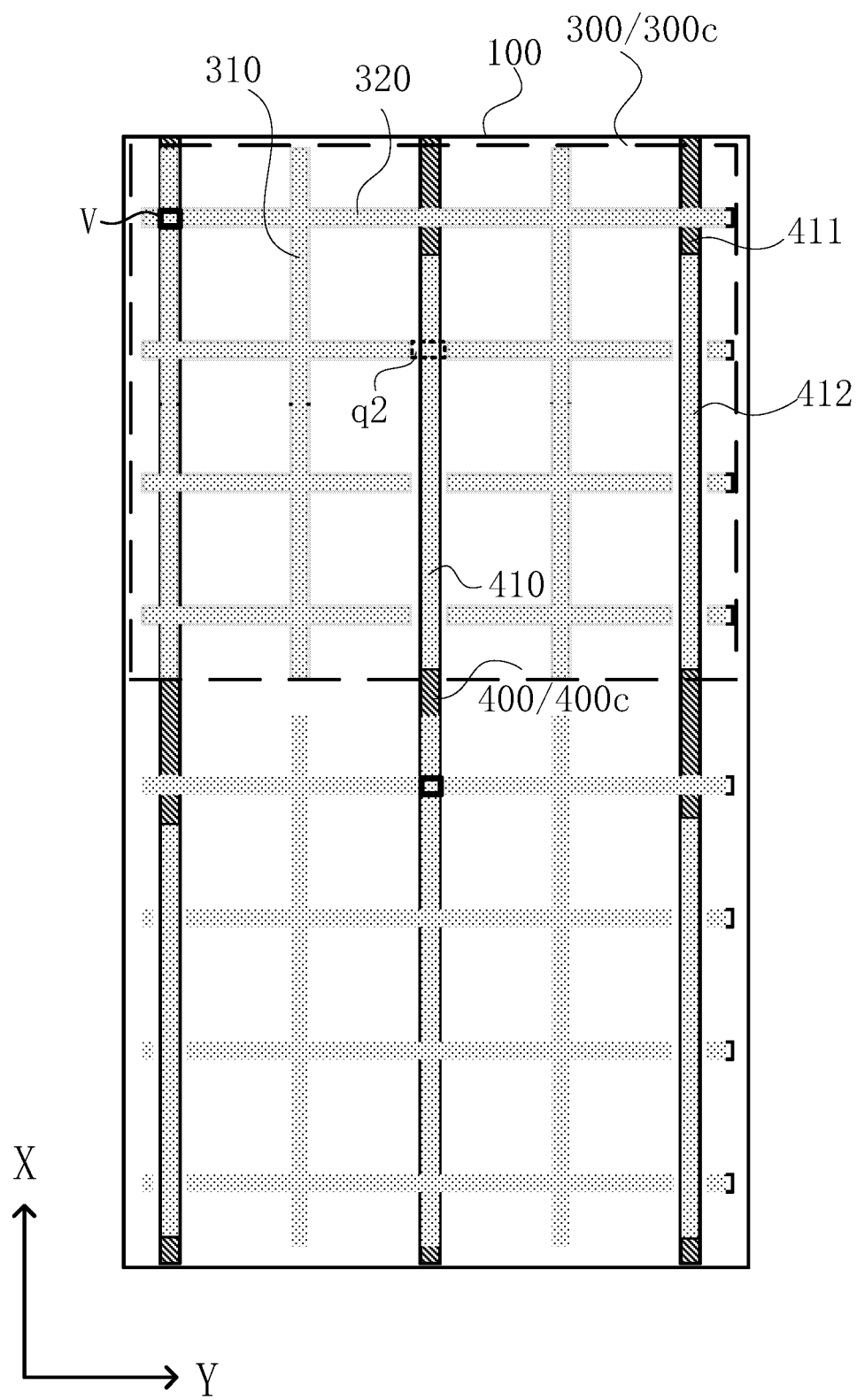
FIG. 18 illustrates another enlarged schematic diagram of part A in the touch display panel shown in FIG. 1, consistent with the disclosed embodiments of the present disclosure.

FIG. 18 illustrates another enlarged schematic diagram of part A in the touch display panel shown in FIG. 1. With reference to FIG. 18, along the direction perpendicular to the plane where the substrate 100 is located, in at least one third touch electrode 300c, only one second electrode line 320 overlaps the first sub-portion 411. As a result, the overlap area of the vertical projection of the first wiring portion 410 on the plane where the substrate 100 is located and the vertical projection of the first electrode line 310 on the plane where the substrate 100 is located may be minimized, and meanwhile, signal transmission between each electrode line in the third touch electrode 300c may be realized.

Figure 19:
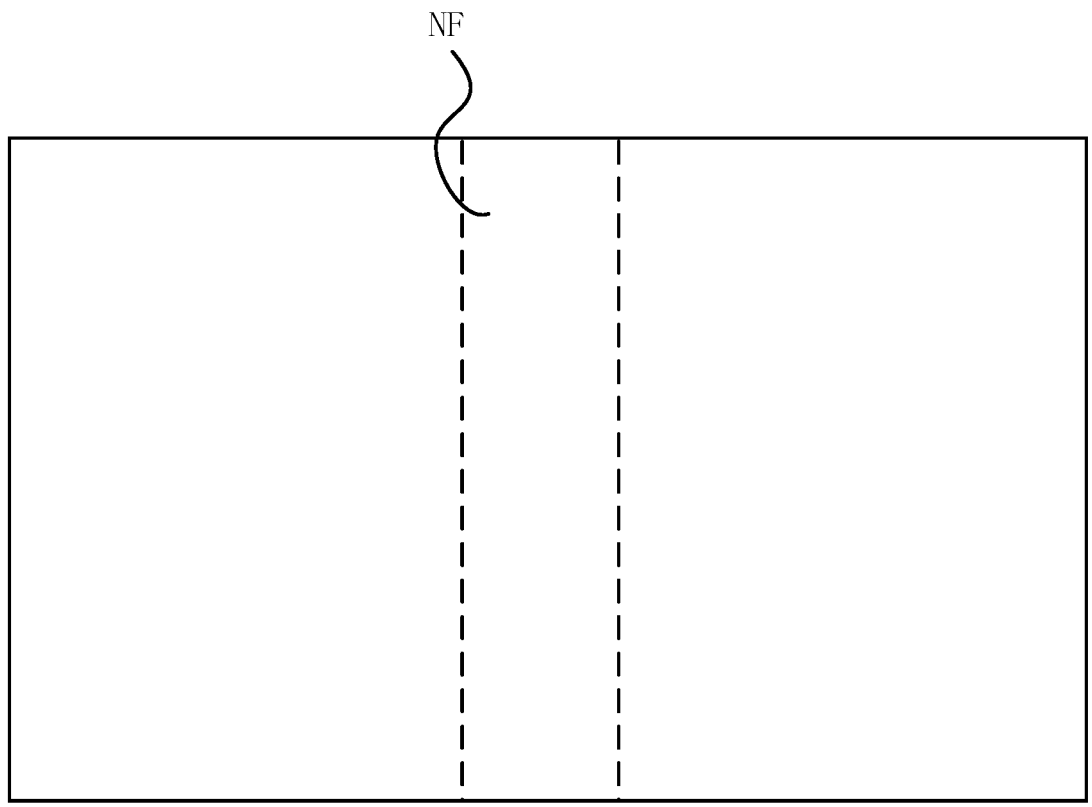
FIG. 19 illustrates a schematic top view of another touch display panel consistent with the disclosed embodiments of the present disclosure.

FIG. 19 illustrates a schematic top view of another touch display panel consistent with the disclosed embodiments of the present disclosure. As shown in FIG. 19, in some embodiments, the touch display panel may include at least one bending area NF. The touch display panel is a bendable display panel, and a portion of the touch display panel located in the bending area NF may be bent. The bending area NF may include a third touch lead (not shown in FIG. 19). Exemplarily, a structure of the third touch lead in the bending area NF may refer to the structure of the third touch lead 400c in FIG. 11. In an area corresponding to the touch electrode 300 that is insulated from the third touch lead 400c, since the first wiring portion 410 in the third touch lead 400c is partially located in the second metal layer 230, the area of the second metal layer 230 for disposing the first wiring portion 410 may not be disposed with the first electrode line 310. Accordingly, wirings in the first metal layer 210 corresponding to this area may be reduced, and thus the bending stress in this area may be reduced. In the bending area NF, at least part of the touch leads are third touch leads, and thus bending of the bending area NF may be achieved.

It should be noted that, FIG. 19 exemplarily shows that the touch display panel may include a bending area NF. In some other embodiments of the present disclosure, the touch display panel may include two or more bending areas NF.

In one embodiment, the touch display panel may include a bending area. The third touch lead 400c in the bending area may include a structure of the third touch lead 400c described in FIG. 11. In some other embodiments of the present disclosure, the third touch lead 400c in the bending area may include other structures.

Figure 20:
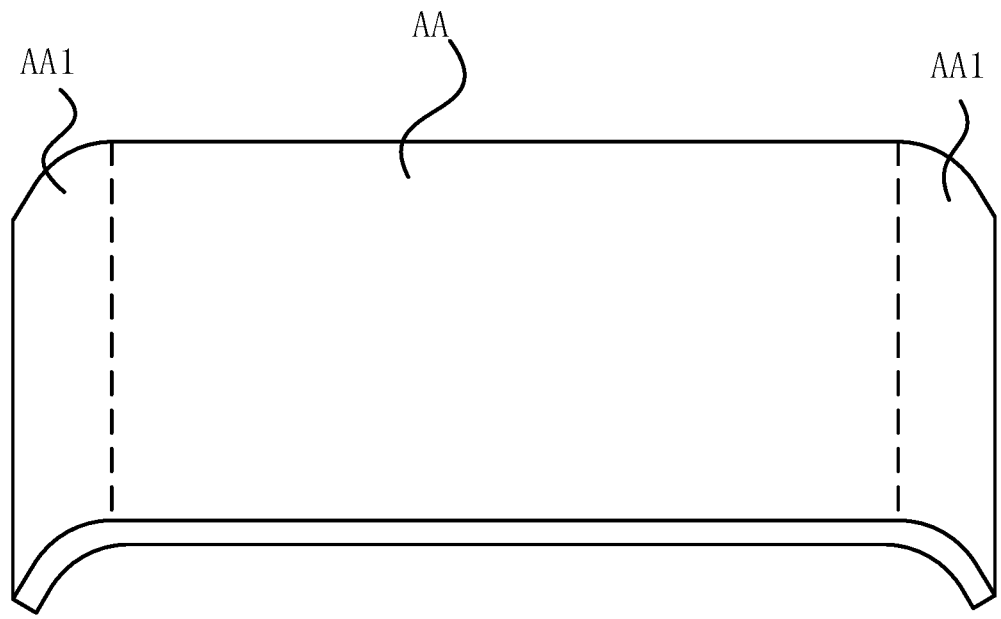
FIG. 20 illustrates a schematic top view of another touch display panel consistent with the disclosed embodiments of the present disclosure.

FIG. 20 illustrates a schematic top view of another touch display panel consistent with the disclosed embodiments of the present disclosure. With reference to FIG. 20, in some embodiments, the touch display panel may be a bendable display panel. The touch display panel may include a display area AA. The display area AA may include a first display area AA1. The first display area AA1 may be curved toward a direction away from the light exiting side of the touch display panel. The first display area AA1 may include a third touch lead (not shown in FIG. 20). Exemplarily, a structure of the third touch lead in the first display area AA1 may refer to the structure of the third touch lead 400c shown in FIG. 11. In an area corresponding to the touch electrode 300 that is insulated from the third touch lead 400c, since the first wiring portion 410 in the third touch lead 400c is partially located in the second metal layer 230, the area of the second metal layer 230 for disposing the first wiring portion 410 may not be disposed with the first electrode line 310. Accordingly, wirings in the first metal layer 210 corresponding to this area may be reduced, and thus the bending stress in this area may be reduced. In the first display area AA1, at least part of the touch leads may be third touch leads, and thus bending of the first display area AA1 may be achieved.

It should be noted that, FIG. 20 exemplarily shows that the touch display panel may include two first display areas AA1. In some other embodiments of the present disclosure, the touch display panel may include other numbers of first display areas AA1.

In one embodiment, the third touch lead 400c in the first display area AA1 in the touch display panel may include the structure of the third touch lead 400c described in FIG. 11. In some other embodiments of the present disclosure, the third touch lead 400c in the first display area AA1 may include other structures.

With continuous reference to FIG. 1, in some embodiments, the touch display panel may also include a plurality of sub-pixels P. The sub-pixels P may emit light to realize displaying function of the touch display panel.

In the touch electrode 300, a plurality of first electrode lines 310 and a plurality of second electrode lines 320 intersect, defining a plurality of meshes. That is, the touch electrode 300 has a metal mesh structure. A vertical projection of at least one mesh on the substrate 100 surrounds a vertical projection of at least one sub-pixel P on the substrate 100. That is, the vertical projection of at least one sub-pixel P on the substrate 100 is located in the vertical projection of a mesh in the touch electrode 300 on the substrate 100. Accordingly, the first electrode lines 310 and the second electrode lines 320 in the touch electrode 300 may not block the light-emitting area of the sub-pixel P, and thus the display effect of the touch display panel may be improved. In addition, the meshes of the touch electrode 300 may be arranged corresponding to the sub-pixels P, and thus the mesh density of the touch electrode 300 may be increased. Accordingly, the touch sensitivity of the touch display panel may be improved. In one embodiment, the mesh may be a ring-shaped structure defined by intersection of metal electrode lines.

Along the direction perpendicular to the plane where the substrate 100 is located, the touch lead 400 may not overlap the sub-pixel P. Accordingly, shielding of the light-emitting area of the sub-pixel P by the touch lead 400 may be avoided, and thus the display effect of the touch display panel may be improved.

Figure 21:
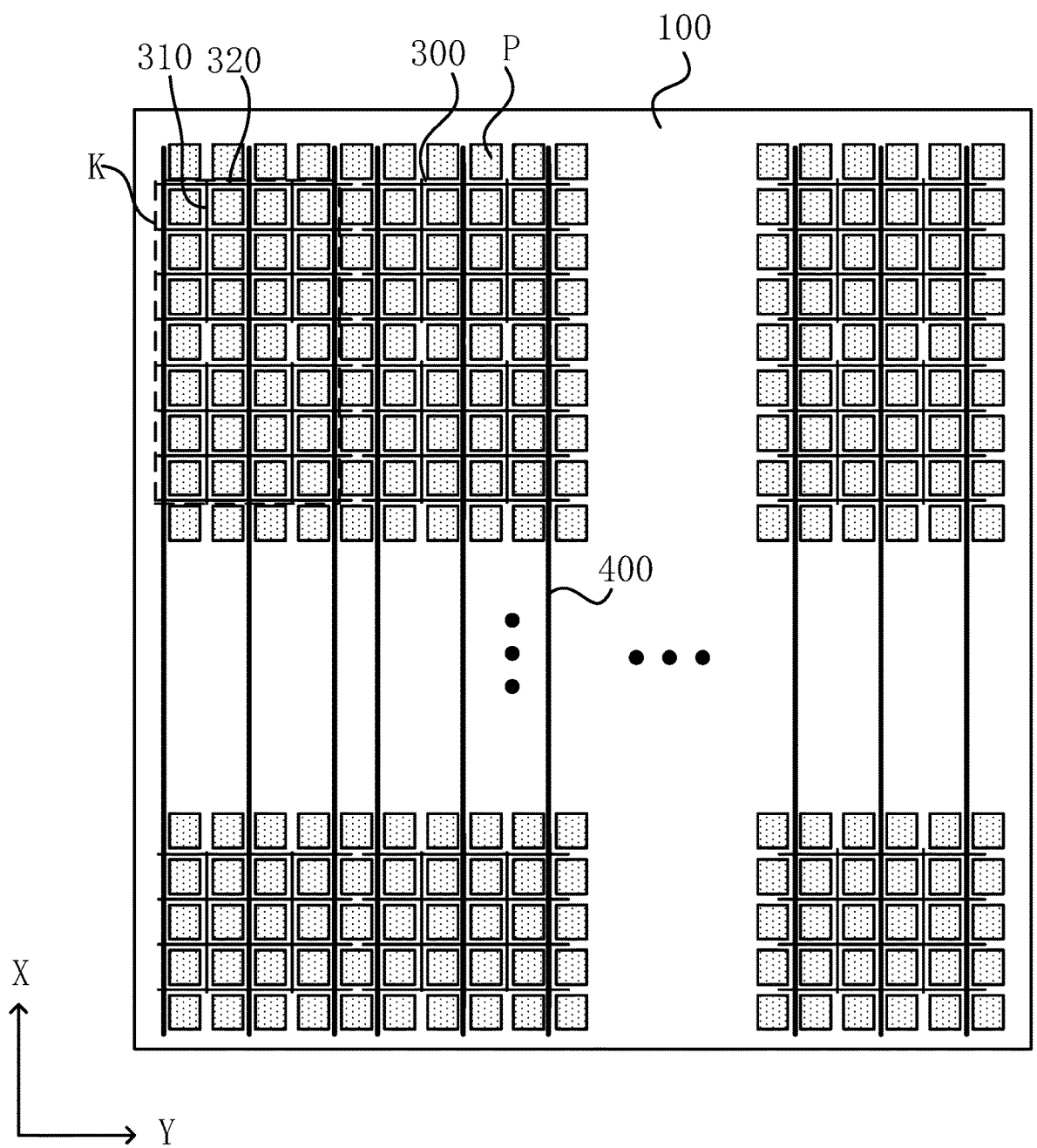
FIG. 21 illustrates a schematic top view of another touch display panel consistent with the disclosed embodiments of the present disclosure.
Figure 22:
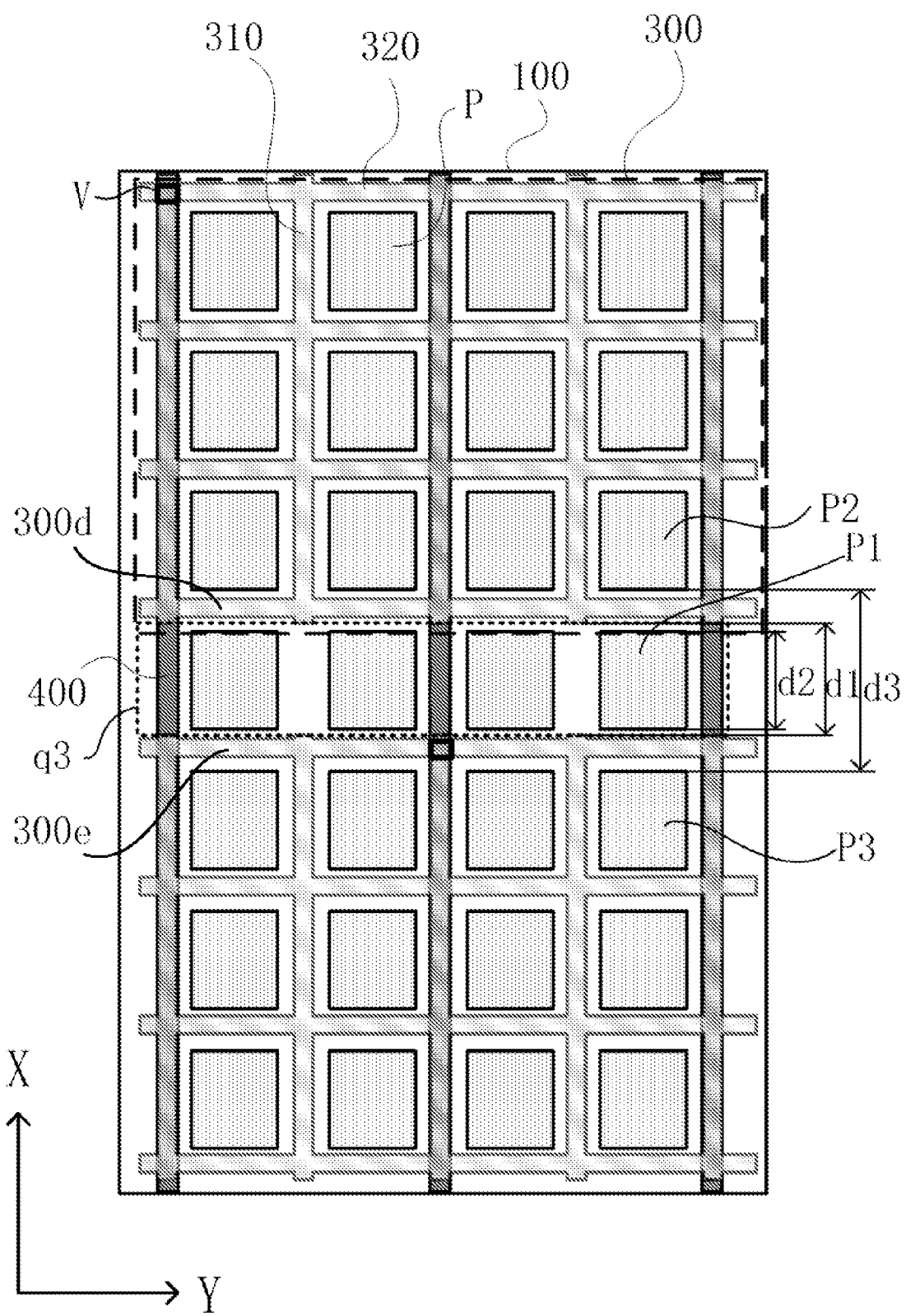
FIG. 22 illustrates an enlarged schematic diagram of part K in the touch display panel shown in FIG. 21, consistent with the disclosed embodiments of the present disclosure.

FIG. 21 illustrates a schematic top view of another touch display panel. FIG. 22 illustrates an enlarged schematic diagram of part K in the touch display panel shown in FIG. 21. With reference to FIGS. 21 and 22, in some embodiments, the touch electrodes 300 may be arranged in an array along the first direction X and the second direction Y.

In the first direction X, a length of the gap q3 between two adjacent touch electrodes 300 arranged along the first direction X is d1. It should be noted that, in the first direction X, the length of the gap q3 between two adjacent touch electrodes 300 arranged along the first direction X refers to a minimum length of the gap q3, in the first direction X, between two adjacent touch electrodes 300 arranged along the first direction X.

In the first direction X, the length of the sub-pixel P located between two adjacent touch electrodes 300 arranged along the first direction X is d2. In the first direction X, a distance between two sub-pixels P adjacent to the sub-pixel P located between two adjacent touch electrodes 300 arranged along the first direction X is d3. It should be noted that, in one embodiment, the two adjacent touch electrodes 300 arranged along the first direction X are two adjacent touch electrodes 300 arranged along the first direction X based on a same position. Exemplarily, two adjacent touch electrodes 300 arranged along the first direction X are touch electrode 300d and touch electrode 300e, respectively. The length of the gap between the touch electrode 300d and the touch electrode 300e in the first direction X is d1. The length of the sub-pixel P1 between the touch electrode 300d and the touch electrode 300e in the first direction X is d2. In the first direction X, the distance between the two sub-pixels P2 and P3 adjacent to the sub-pixel P1 is d3.

In existing technologies, the length of the gap between two adjacent touch electrodes is generally much smaller than the length of one sub-pixel. The small length of the gap between two adjacent touch electrodes may cause the risk of a short circuit between two adjacent touch electrodes.

In the present disclosure, the length of the gap q3 between the touch electrode 300d and the touch electrode 300e in the first direction X is greater than or equal to the length of the sub-pixel P1 in the first direction X, that is, $d2 \leq d1$. Since the gap between the touch electrode 300d and the touch electrode 300e is larger, the risk of a short circuit between the touch electrode 300d and the touch electrode 300e may be reduced. In addition, the length of the gap q3 between the touch electrode 300d and the touch electrode 300e in the first direction X is less than or equal to the distance between the sub-pixel P2 and the sub-pixel P3, that is, $d1 \leq d3$. Since the gap q3 between the touch electrode 300d and the touch electrode 300e is not too large, the touch sensitivity of the touch display panel may not be affected. In the present disclosure, $d2 \leq d1 \leq d3$. Accordingly, the effect on the touch sensitivity of the touch display panel may be small, and meanwhile, the risk of a short circuit between the touch electrode 300d and the touch electrode 300e may be reduced.

Figure 23:
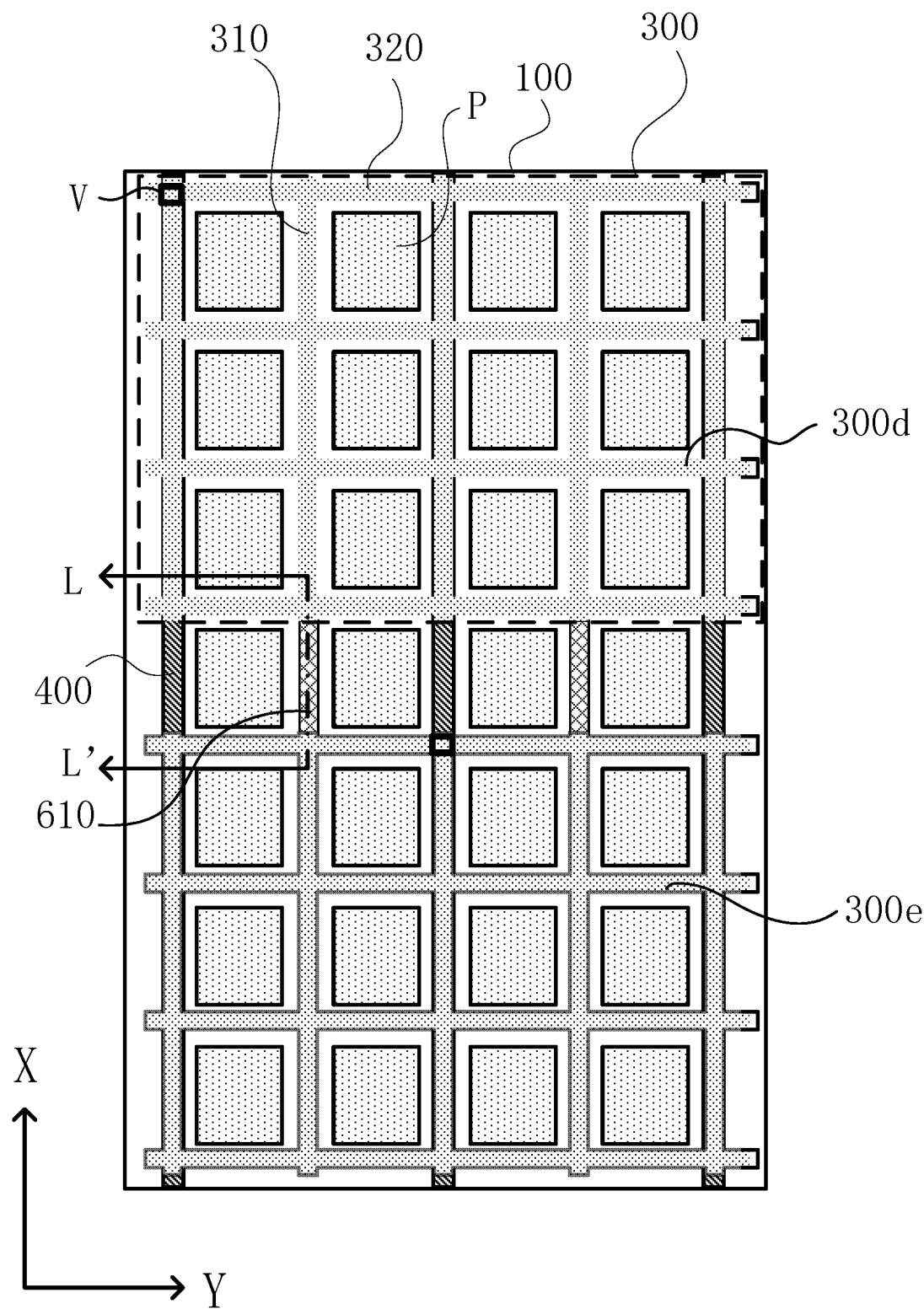
FIG. 23 illustrates another enlarged schematic diagram of part K in the touch display panel shown in FIG. 21, consistent with the disclosed embodiments of the present disclosure.
Figure 24:
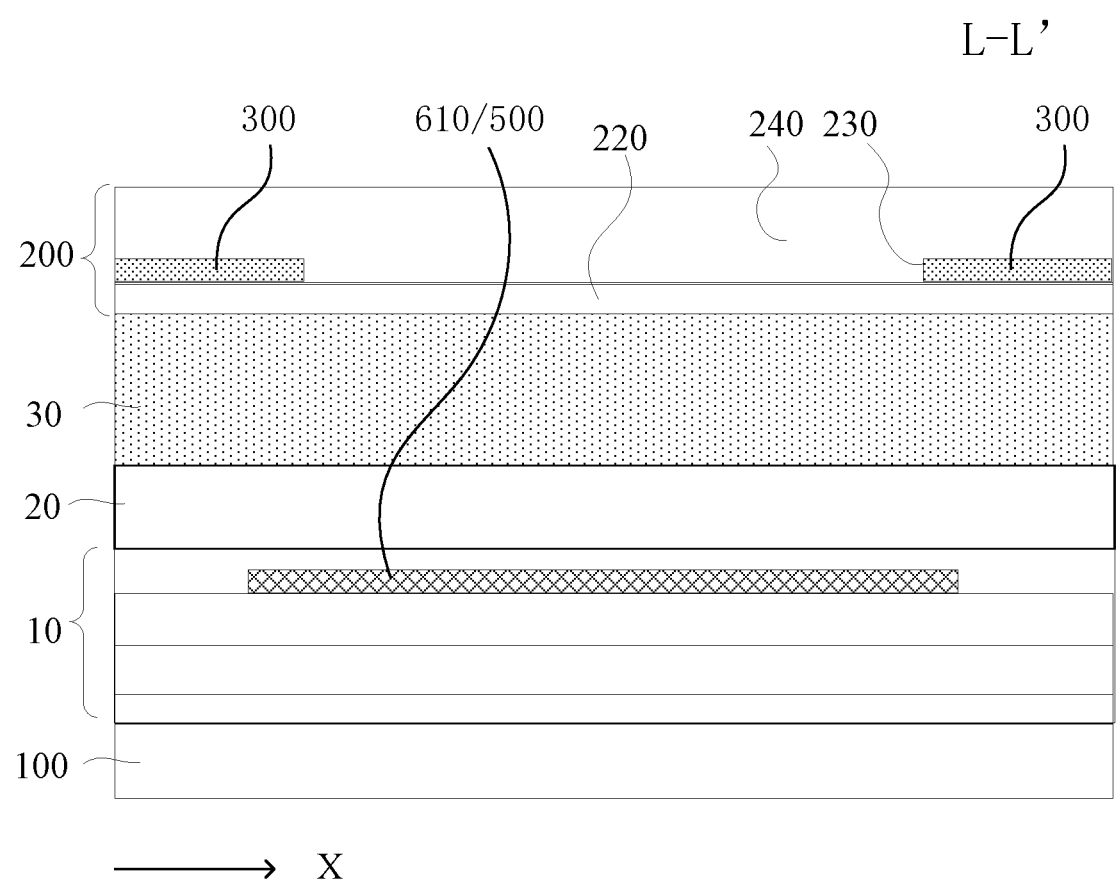
FIG. 24 illustrates a cross-sectional view along L-L' direction of the touch display panel shown in FIG. 23, consistent with the disclosed embodiments of the present disclosure.

FIG. 23 illustrates another enlarged schematic diagram of part K in a touch display panel shown in FIG. 21. FIG. 24 illustrates a cross-sectional view along L-L' direction of the touch display panel shown in FIG. 23. With reference to FIGS. 23 and 24, in some embodiments, the touch display panel may also include an array layer 10. The array layer 10 is located between the substrate 100 and the touch layer 200. The array layer 10 may include a third metal layer 500.

In the first direction X, a plurality of first dummy lines 610 is disposed between two adjacent touch electrodes 300. The first dummy line 610 extends along the first direction X.

Along the direction perpendicular to the plane where the substrate 100 is located, each of two ends of the first dummy line 610 overlaps an adjacent touch electrode 300, respectively. The first dummy line 610 does not overlap the sub-pixel P. The first dummy line 610 is also made of a metal material. The first dummy line 610 is disposed at the disconnection spacing between two adjacent touch electrodes 300 in the first direction X. Accordingly, a problem that the pattern of the touch electrode 300 may be visible due to the large spacing between two adjacent touch electrodes 300 in the first direction X may be alleviated. Optionally, in the first direction X, the first dummy line 610 may not be disposed in an area between two adjacent touch electrodes 300, where the touch lead 400 is disposed.

The first dummy line 610 is located in the third metal layer 500 of the array layer 10, and no additional metal layer is required to form the first dummy line 610. Accordingly, the thickness of the touch display panel may be reduced, the manufacturing process may be simplified, and the production cost may be reduced. Optionally, the third metal layer 500 may be a gate metal layer. The third metal layer 500 may also be a source/drain metal layer, or other metal layers in the array layer 10.

Figure 25:
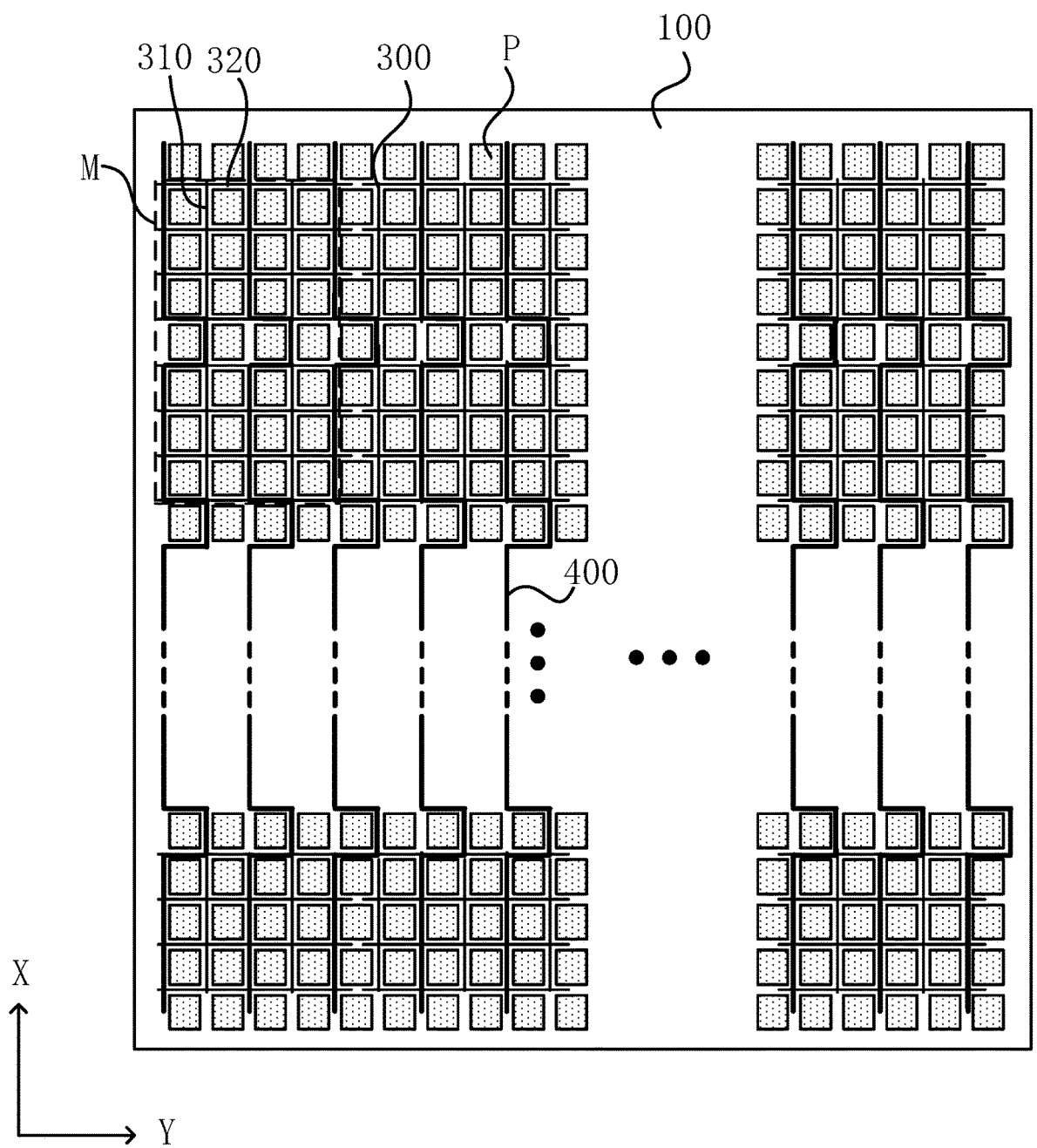
FIG. 25 illustrates a schematic top view of another touch display panel consistent with the disclosed embodiments of the present disclosure.
Figure 26:
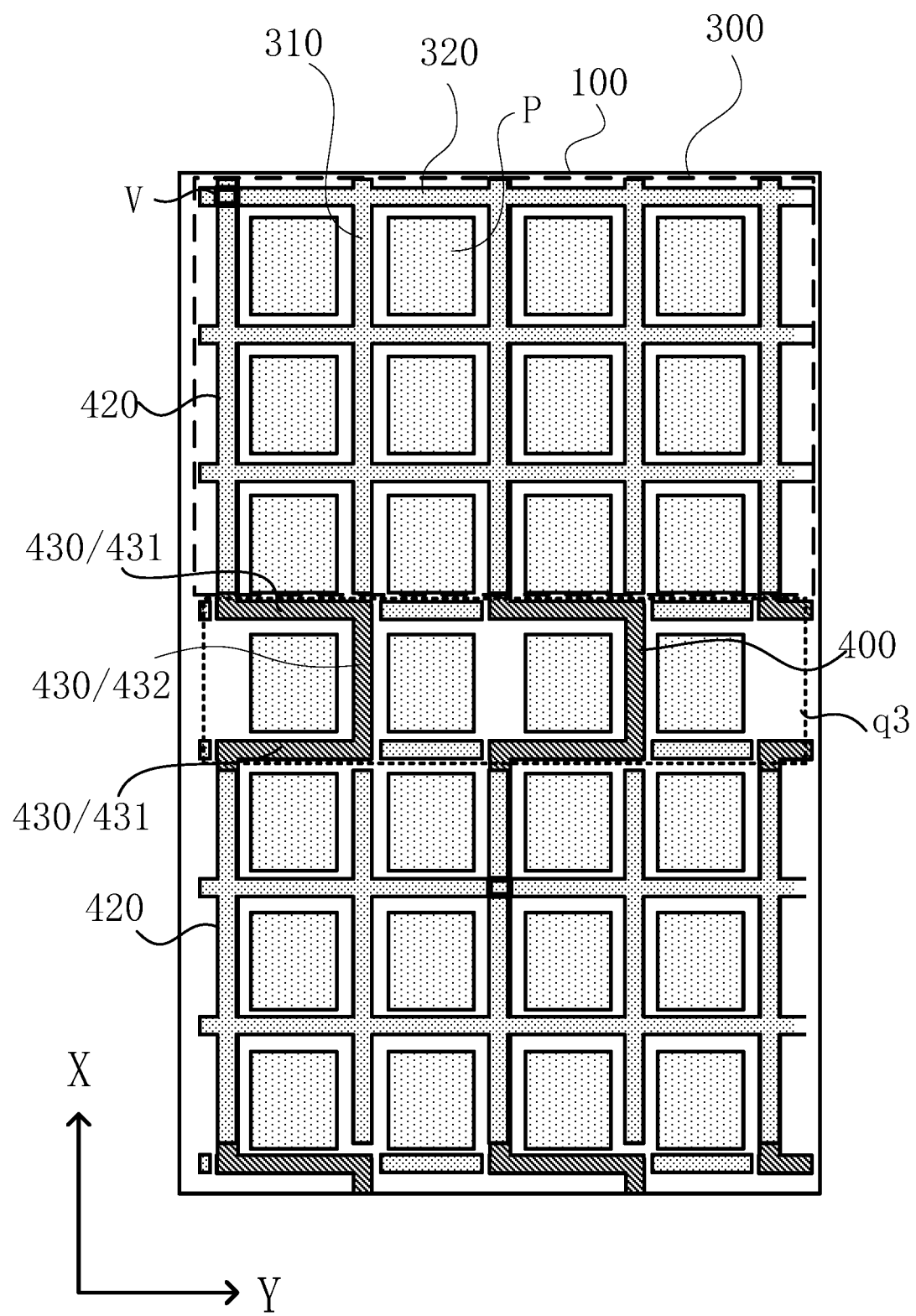
FIG. 26 illustrates an enlarged schematic diagram of part M in the touch display panel shown in FIG. 25, consistent with the disclosed embodiments of the present disclosure.

FIG. 25 illustrates a schematic top view of another touch display panel. FIG. 26 illustrates an enlarged schematic diagram of part M in the touch display panel shown in FIG. 25. With reference to FIGS. 25 and 26, in some embodiments, the touch electrodes 300 may be arranged in an array along the first direction X and the second direction Y.

The touch lead 400 may include a first branch 420 and a second branch 430 connected to each other. The second branch 430 is connected between two adjacent first branches 420 along the first direction X. The second branch 430 is located in the gap q3 between two adjacent touch electrodes 300 arranged along the first direction X. Optionally, along a direction perpendicular to the plane where the substrate 100 is located, the first branch 420 and the touch electrode 300 at least partially overlap.

The second branch 430 and the touch electrode 300 may be located on different metal layers. Along the direction perpendicular to the plane where the substrate 100 is located, the second branch 430 and the touch electrode 300 do not overlap. Accordingly, a short circuit between the second branch 430 and the touch electrode 300 may be avoided.

In existing technologies, a step may be formed in an area where the touch lead is disposed in the touch display panel. When the touch electrode is subsequently fabricated in the metal layer, a problem of etching residue may appear in this area. The part of the touch lead located in the gap between two adjacent touch electrodes arranged along the first direction extends along the first direction. When making the touch electrode, etching residues may appear at an area corresponding to the touch lead and in the gap between two adjacent touch electrodes arranged in the first direction. The first electrode line in the touch electrode also extends along the first direction. Thus, a short circuit between the first electrode lines corresponding to two adjacent touch electrodes arranged in the first direction may appear, thereby causing a short circuit between two adjacent touch electrodes arranged in the first direction. It should be noted that the first electrode lines corresponding to two adjacent touch electrodes arranged in the first direction refers to, in two adjacent touch electrodes arranged in the first direction, one first electrode line in one touch electrode and another first electrode line in the other touch electrode are adjacent in the first direction and arranged along the first direction. No other first electrode lines may be disposed between the two first electrode lines.

In one embodiment, the second branch 430 may include two first segments 431 connected to different first branches 420, and a second segment 432 connected to the two first segments 431. One end of the first segment 431 is connected to the second segment 432, and the other end of the first segment 431 is connected to the first branch 420. The second segment 432 extends in the first direction X, and the first segment 431 extends in the second direction Y. That is, the second branch 430 in the touch lead 400 is designed with a corner structure, such that the vertical projection of the second branch 430 on the substrate 100 at least partially surrounds the vertical projection of a sub-pixel P on the substrate 100. In addition, along the direction perpendicular to the plane where the substrate 100 is located, the second branch 430 may not overlap the touch electrode 300. Accordingly, when fabricating the touch electrode 300, even etching residue may appear in an area in the metal layer corresponding to the second branch 430, the risk of a short circuit between two adjacent touch electrodes 300 arranged in the first direction X may be reduced.

Figure 27:
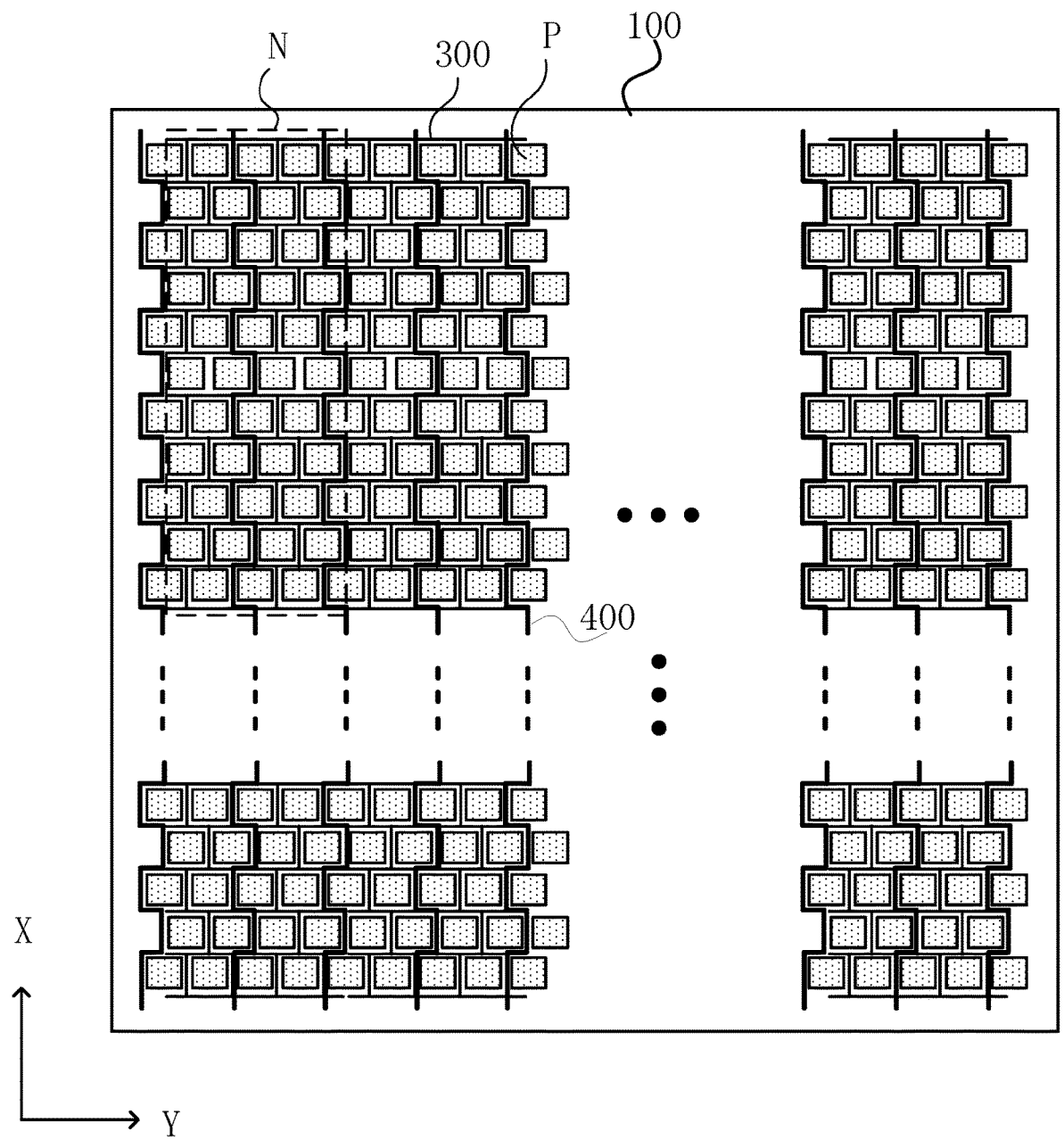
FIG. 27 illustrates a schematic top view of another touch display panel consistent with the disclosed embodiments of the present disclosure.
Figure 28:
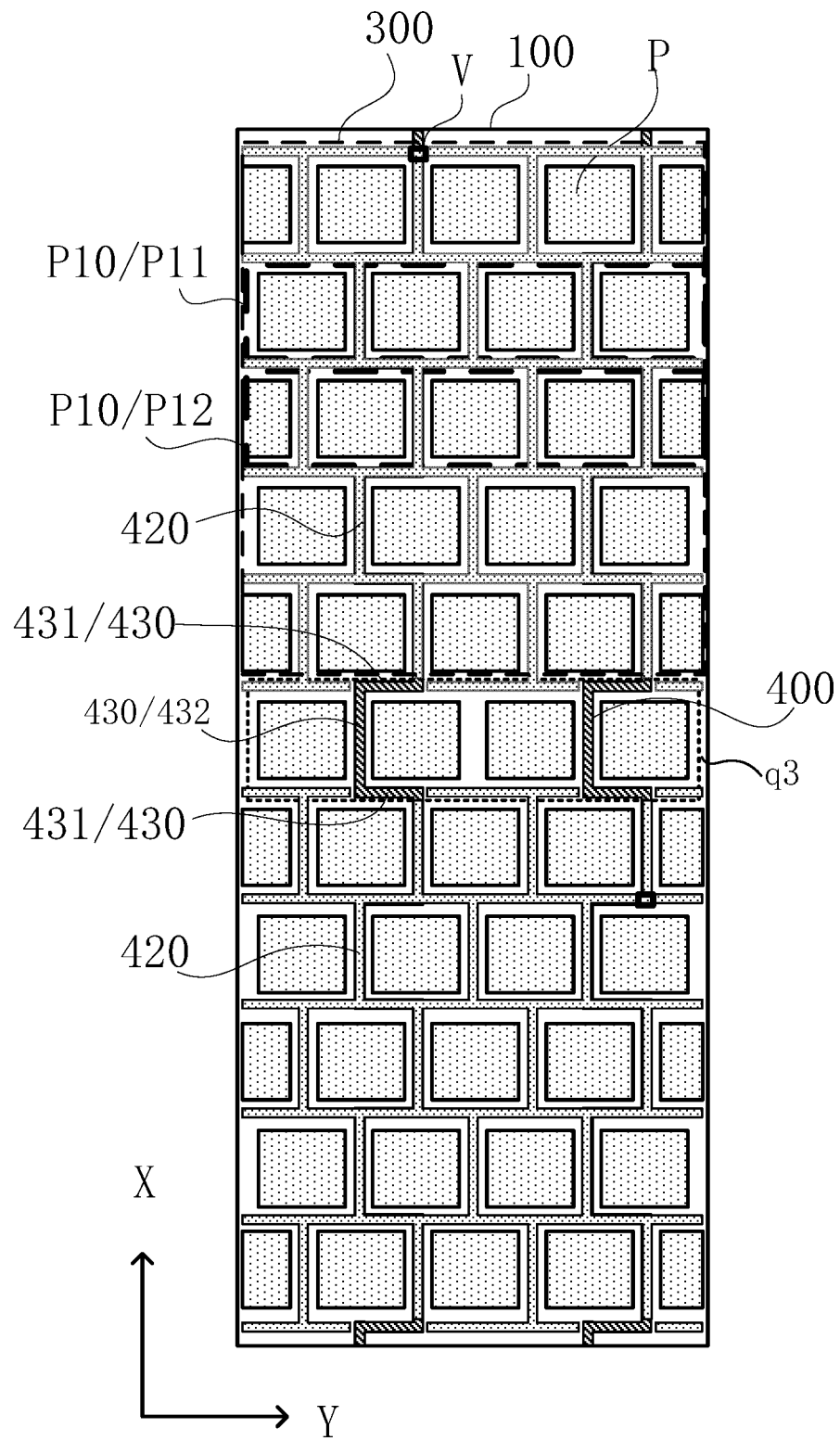
FIG. 28 illustrates an enlarged schematic diagram of part N in the touch display panel shown in FIG. 27, consistent with the disclosed embodiments of the present disclosure.

FIG. 27 illustrates a schematic top view of another touch display panel consistent with the disclosed embodiments of the present disclosure. FIG. 28 illustrates an enlarged schematic diagram of part N in the touch display panel shown in FIG. 27. With reference to FIGS. 27 and 28, in some embodiments of the present disclosure, the touch display panel may include a plurality of sub-pixel rows P10 arranged in the first direction X. The sub-pixel row P10 may include a plurality of sub-pixels P arranged in the second direction Y.

The sub-pixel row P10 may include a first sub-pixel row P11 and a second sub-pixel row P12. Along the first direction X, the first sub-pixel row P11 and the second sub-pixel row P12 are arranged at an interval. In the first direction X, one sub-pixel P in the first sub-pixel row P11 may overlap two adjacent sub-pixels P in the second sub-pixel row P12. Along the direction perpendicular to the plane where the substrate 100 is located, the touch lead 400 and the sub-pixel P do not overlap. With this arrangement method of the sub-pixels P in the touch display panel, the touch lead 400 needs to include a plurality of corner structures. The vertical projection of the corner structures on the substrate 100 partially surrounds the vertical projection of the sub-pixels P on the substrate 100. Correspondingly, the second branch 430 in the touch lead 400 also includes corner structures. The vertical projection of the second branch 430 on the substrate 100 partially surrounds the vertical projection of the sub-pixels P on the substrate 100.

The second branch 430 in the touch lead 400 includes corner structures. The vertical projection of the second branch 430 on the substrate 100 partially surrounds the vertical projection of the sub-pixels P on the substrate 100. In addition, along the direction perpendicular to the plane where the substrate 100 is located, the second branch 430 does not overlap the touch electrode 300. Accordingly, when fabricating the touch electrodes 300, even etching residue may appear in an area in the metal layer corresponding to the second branch 430, the risk of a short circuit between two adjacent touch electrodes 300 arranged in the first direction X may be reduced.

Figure 29:
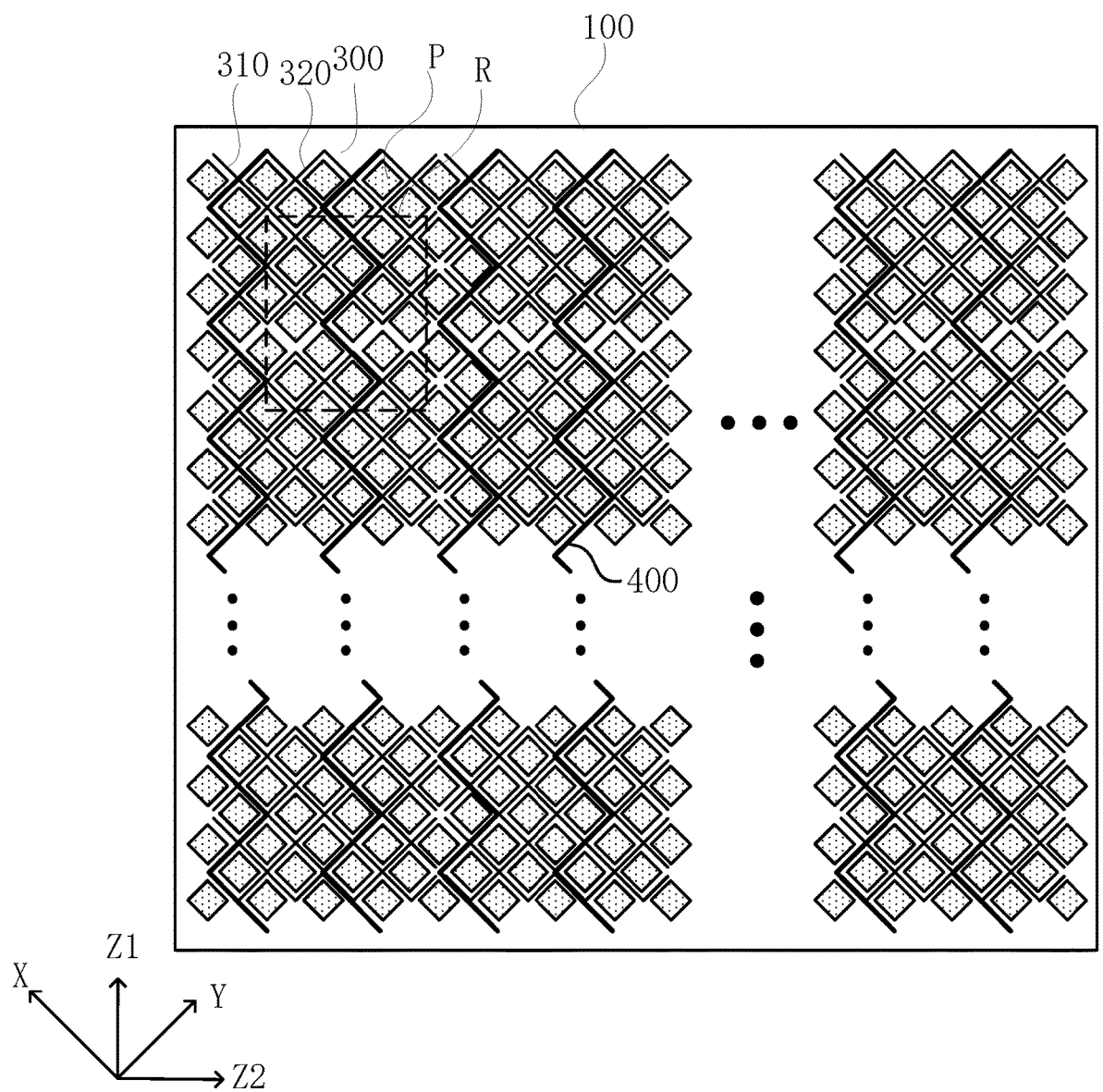
FIG. 29 illustrates a schematic top view of another touch display panel consistent with the disclosed embodiments of the present disclosure.
Figure 30:
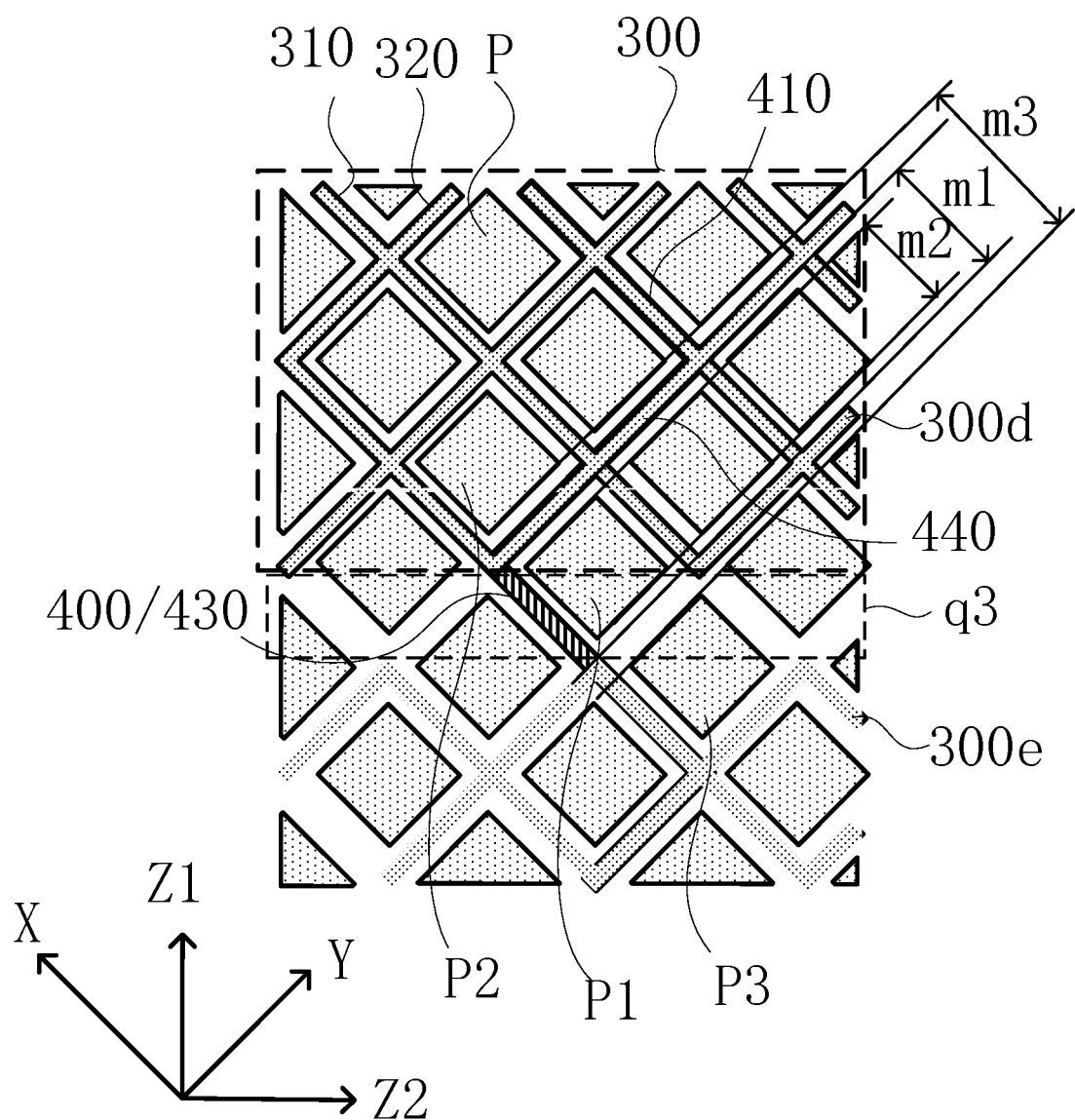
FIG. 30 illustrates an enlarged schematic diagram of part R in the touch display panel shown in FIG. 29, consistent with the disclosed embodiments of the present disclosure.

FIG. 29 illustrates a schematic top view of another touch display panel consistent with the disclosed embodiments of the present disclosure. FIG. 30 illustrates an enlarged schematic diagram of part R in the touch display panel shown in FIG. 29. With reference to FIGS. 29 and 30, in some embodiments, the touch electrodes 300 are arranged in an array along a third direction Z1 and a fourth direction Z2. The third direction Z1 intersects the fourth direction Z2. The third direction Z1 intersects each of the first direction X and the second direction Y. The fourth direction Z2 intersects each of the first direction X and the second direction Y. Optionally, the third direction Z1 is perpendicular to the fourth direction Z2.

The touch lead 400 may also include a second wiring portion 440 extending along the second direction Y. Along a direction perpendicular to the plane where the substrate 100 is located, the second wiring portion 440 and the second electrode line 320 at least partially overlap. Accordingly, shielding of light exited from the touch display panel by the second wiring portion 440 in the touch lead 400 may be reduced, and shielding of light exited from the touch display panel by the touch leads 400 in the touch display panel may be further reduced. Thus, influence on the display effect of the touch display panel may be reduced. In addition, since the touch lead 400 is made of metal, the touch lead 400 may have reflective characteristics. Along the direction perpendicular to the plane where the substrate 100 is located, the first wiring portion 410 and the first electrode line 310 at least partially overlap. Influence of the increase of the reflective area caused by disposing the touch lead 400 may be reduced.

With continuous reference to FIGS. 29 and 30, in some embodiments, the touch lead 400 may include a second branch 430. The second branch 430 is located in the gap q3 between two adjacent touch electrodes 300d and 300e arranged along the third direction Z1. The second branch 430 is located between the insulated touch electrode 300d and the touch electrode 300e. At the disconnection spacing between the touch electrode 300d and the touch electrode 300e, the second branch 430 extends along the first direction X. That is, the length of the second branch 430 in the first direction X is proportional to the length of the gap q3 between the touch electrode 300d and the touch electrode 300e in the third direction Z1.

In the first direction X, the length of the second branch 430 is m1. In the first direction X, the length of the sub-pixel P1 located between two adjacent touch electrodes 300d and 300e arranged along the third direction Z1 is m2. In the first direction X, the distance between the two sub-pixels P2 and P3 adjacent to the sub-pixel P1 located between the two adjacent touch electrodes 300d and 300e arranged along the third direction Z1 is m3.

The length of the second branch 430 in the first direction X is greater than or equal to the length of the sub-pixel P1 in the first direction X, that is, m$2 \le$m$1$. That is, the second branch 430 has a longer length in the first direction X. The longer length of the second branch 430 in the first direction X means that the gap q3 between the touch electrode 300d and the touch electrode 300e has a longer length in the third direction Z1. Accordingly, risk of a short circuit between the touch electrode 300d and the touch electrode 300e may be reduced. Meanwhile, the length of the second branch 430 in the first direction X is less than or equal to the distance between the sub-pixel P2 and the sub-pixel P3, that is, m$1 \le$m$3$. Thus, the length of the second branch 430 in the first direction X may not be too large, that is, the length of the gap q3 between the touch electrode 300d and the touch electrode 300e in the third direction Z1 may not be too large. As such, the influence on the touch sensitivity of the touch display panel may be reduced. In the present disclosure, m$2 \le$m$1 \le$m$3$. Accordingly, the risk of a short circuit between the touch electrode 300d and the touch electrode 300e may be reduced, and meanwhile, the influence on the touch sensitivity of the touch display panel may be reduced.

Figure 31:
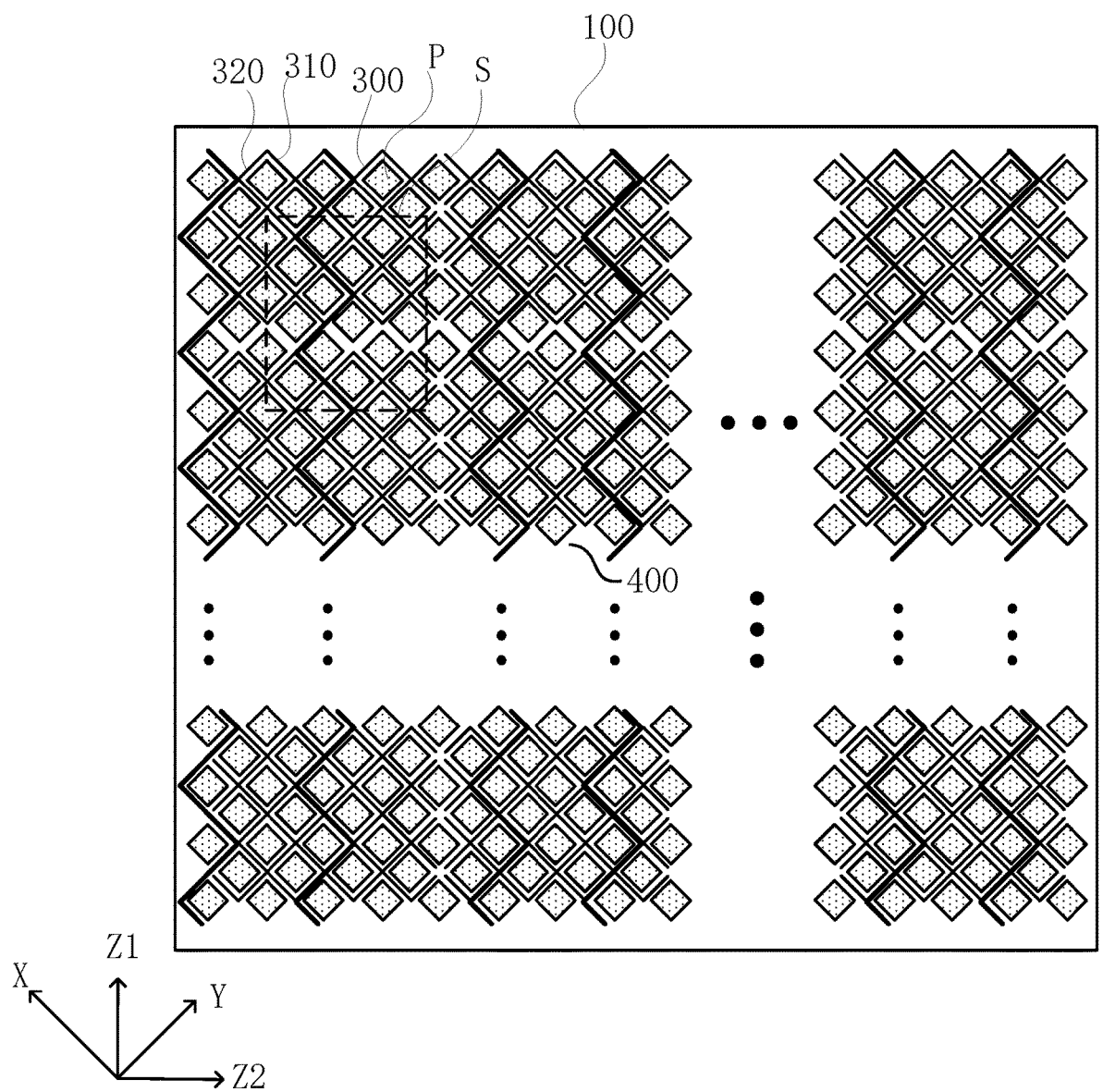
FIG. 31 illustrates a schematic top view of another touch display panel consistent with the disclosed embodiments of the present disclosure.
Figure 32:
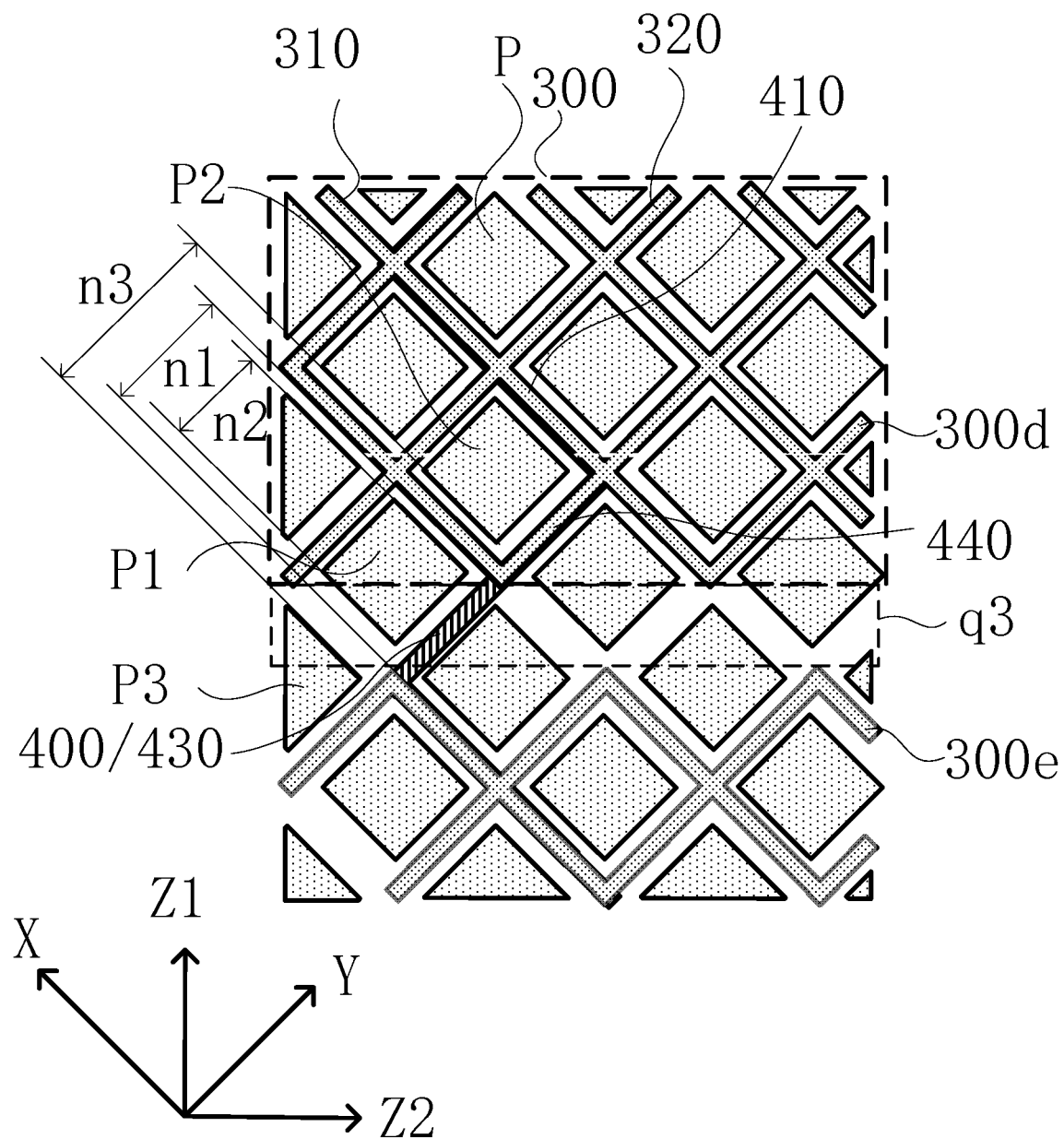
FIG. 32 illustrates an enlarged schematic diagram of part S in the touch display panel shown in FIG. 31, consistent with the disclosed embodiments of the present disclosure.

FIG. 31 illustrates a schematic top view of another touch display panel consistent with the disclosed embodiments of the present disclosure. FIG. 32 illustrates an enlarged schematic diagram of part S in the touch display panel shown in FIG. 31. With reference to FIGS. 31 and 32, in some embodiments, the touch lead 400 may include a second branch 430. The second branch 430 is located in the gap q3 between two adjacent touch electrodes 300d and 300e arranged along the third direction Z1. The second branch 43 is located between the insulated touch electrode 300d and the touch electrode 300e. At the disconnection spacing between the touch electrode 300d and the touch electrode 300e, the second branch 430 extends along the second direction Y. That is, the length of the second branch 430 in the second direction Y is proportional to the length of the gap q3 between the touch electrode 300d and the touch electrode 300e in the third direction Z1.

In the second direction Y, the length of the second branch 430 is n1. In the second direction Y, the length of the sub-pixel P1 located between two adjacent touch electrodes 300d and 300e arranged along the third direction Z1 is n2. In the second direction Y, the distance between the two sub-pixels P2 and P3 adjacent to the sub-pixel P1 located between the two adjacent touch electrodes 300d and 300e arranged along the third direction Z1 is n3.

The length of the second branch 430 in the second direction Y is greater than or equal to the length of the sub-pixel P1 in the second direction Y, that is, n$2 \le$n$1$. That is, the second branch 430 has a longer length in the second direction Y. The longer length of the second branch 430 in the second direction Y means that the gap q3 between the touch electrode 300d and the touch electrode 300e has a longer length in the third direction Z1. Accordingly, risk of a short circuit between the touch electrode 300d and the touch electrode 300e may be reduced. Meanwhile, the length of the second branch 430 in the second direction Y is less than or equal to the distance between the sub-pixel P2 and the sub-pixel P3, that is, n$1 \le$n$3$. Thus, the length of the second branch 430 in the second direction Y may not be too large. That is, the length of the gap q3 between the touch electrode 300d and the touch electrode 300e in the third direction Z1 may not be too large, and thus the influence on the touch sensitivity of the touch display panel may be reduced. In the present disclosure, n$2 \le$n$1 \le$n$3$. Accordingly, the risk of a short circuit between the touch electrode 300d and the touch electrode 300e may be reduced, and meanwhile, the influence on the touch sensitivity of the touch display panel may be reduced.

Figure 33:
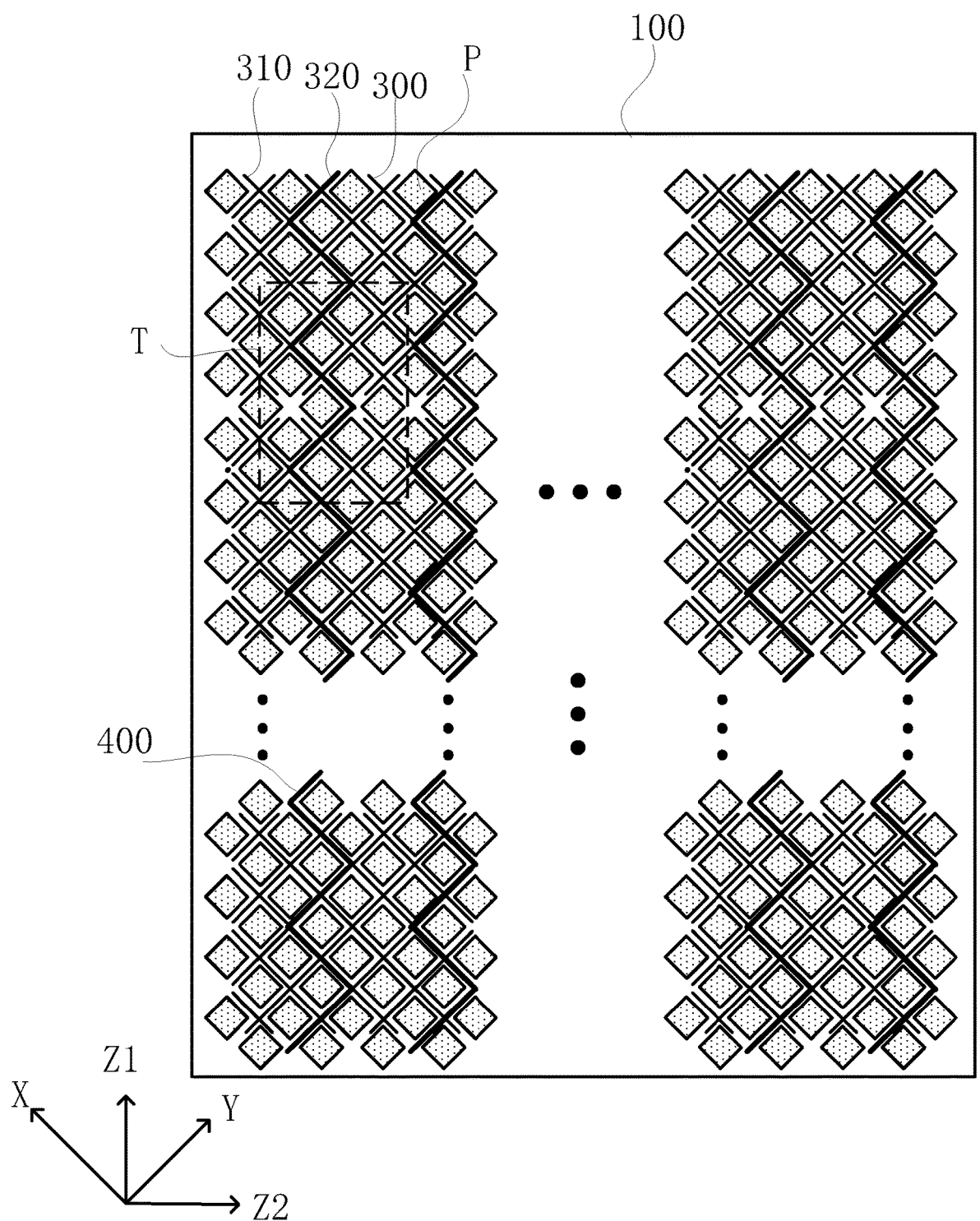
FIG. 33 illustrates a schematic top view of another touch display panel consistent with the disclosed embodiments of the present disclosure.
Figure 34:
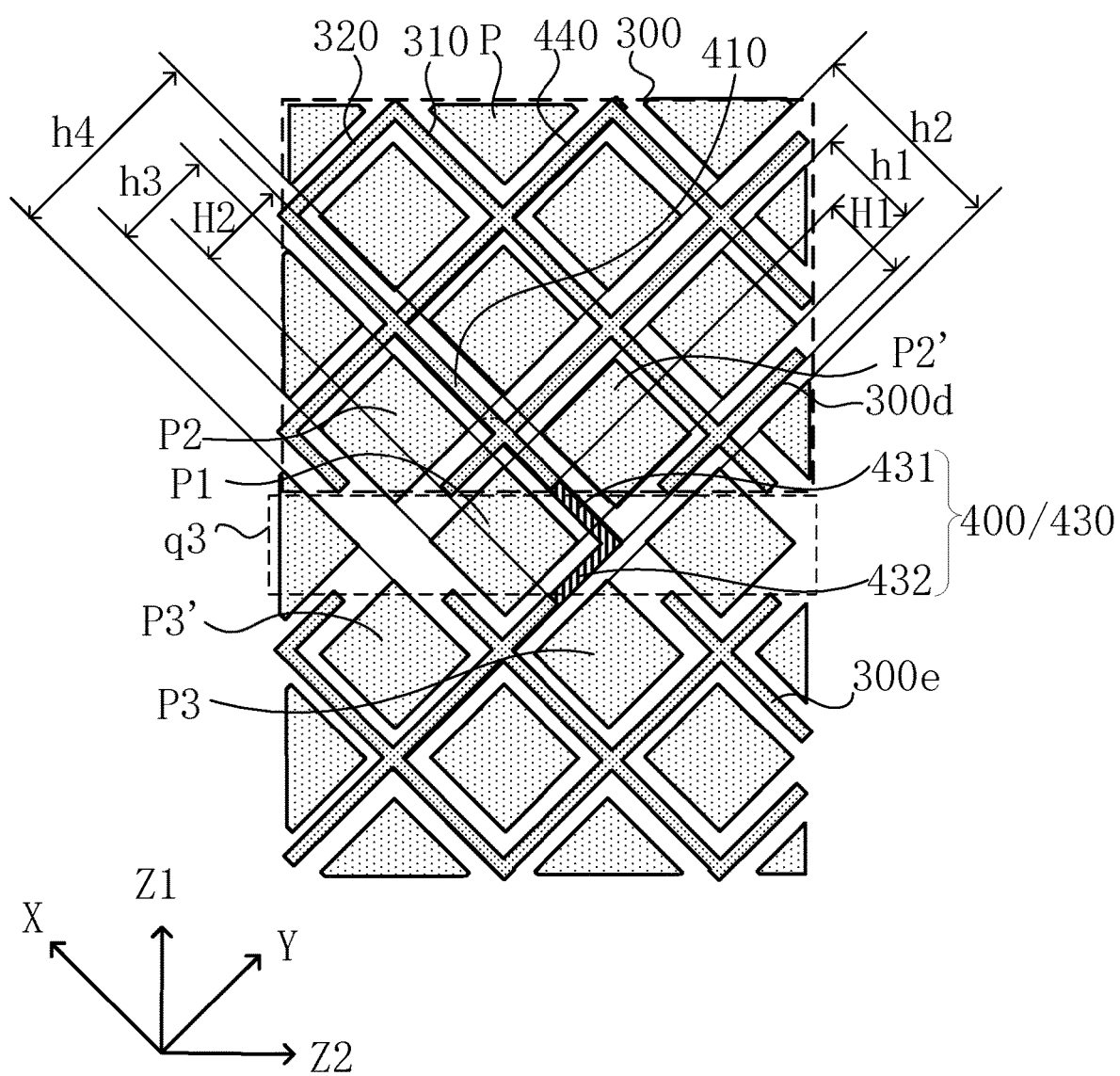
FIG. 34 illustrates an enlarged schematic diagram of part T in the touch display panel shown in FIG. 33, consistent with the disclosed embodiments of the present disclosure.

FIG. 33 illustrates a schematic top view of another touch display panel consistent with the disclosed embodiments of the present disclosure. FIG. 34 illustrates an enlarged schematic diagram of part T in the touch display panel shown in FIG. 33. With reference to FIGS. 33 and 34, in some embodiments, the touch lead 400 may include a second branch 430. The second branch 430 is located in a gap q3 between two adjacent touch electrodes 300d and 300e arranged along the third direction Z1. The second branch 430 is located at the disconnection spacing between the touch electrode 300d and the touch electrode 300e. The second branch 430 located at the disconnection spacing between the touch electrode 300d and the touch electrode 300e may include a third segment 431 and a fourth segment 432. The third segment 431 extends along the first direction X, and the fourth segment 432 extends along the second direction Y. That is, the length of the third part 431 in the first direction X and the length of the fourth part 432 in the second direction Y are each proportional to the length of the gap q3 between the touch electrode 300d and the touch electrode 300e in the third direction Z1.

In the first direction X, the third segment 431 has a length of H1. In the first direction X, the sub-pixel P1 between two adjacent touch electrodes 300d and 300e arranged along the third direction Z1 has a length of h1. In the first direction X, the distance between the two sub-pixels P2 and P3 adjacent to the sub-pixel P1 located between the two adjacent touch electrodes 300d and 300e arranged along the third direction Z1 is h2.

In the second direction Y, the fourth segment 432 has a length of H2. In the second direction Y, the sub-pixel P1 located between two adjacent touch electrodes 300d and 300e arranged along the third direction Z1 has a length of h3. In the second direction Y, the distance between the two sub-pixels P2' and P3' adjacent to the sub-pixel P1 located between the two adjacent touch electrodes 300d and 300e arranged along the third direction Z1 is h4.

The length of the third sub-section 431 in the first direction X is greater than or equal to half of the length of the sub-pixel P1 in the first direction X, that is, (h1)/2≤H1. That is, the third segment 431 has a longer length in the first direction X. In addition, the length of the fourth segment 432 in the second direction Y is greater than or equal to half of the length of the sub-pixel P1 in the second direction Y, that is, (h3)/2≤H2. That is, the fourth segment 432 has a longer length in the second direction Y is longer. The longer length of the third part 431 in the first direction X and the longer length of the fourth part 432 in the second direction Y mean that the length of the gap q3 between the touch electrode 300d and the touch electrode 300e in the third direction Z1 is larger. Accordingly, the risk of a short circuit between the touch electrode 300d and the touch electrode 300e may be reduced. In addition, the length of the third sub-section 431 in the first direction X is less than or equal to the distance between the sub-pixel P2 and the sub-pixel P3, that is H1 (h2)/2. Accordingly, the length of the third segment 431 in the first direction X may not be too large. Also, the length of the fourth sub-section 432 in the second direction Y is less than or equal to the distance between the sub-pixel P2' and the sub-pixel P3', that is, H2≤(h4)/2. Accordingly, the length of the fourth subsection 432 in the second direction Y may not be too large. As such, the third segment 431 may not be too long in the first direction X, and the fourth segment 432 may not be too long in the second direction Y. That is, the length of the gap q3 between the touch electrode 300d and the touch electrode 300e in the third direction Z1 may not be too large, and thus the influence on the touch sensitivity of the touch display panel may be reduced. In the present disclosure, (h1)/2≤H1≤(h2)/2, and (h3)/2≤H2≤(h4)/2. Accordingly, the risk of a short circuit between the touch electrode 300d and the touch electrode 300e may be reduced, and meanwhile, the influence on the touch sensitivity of the touch display panel may be reduced.

Figure 35:
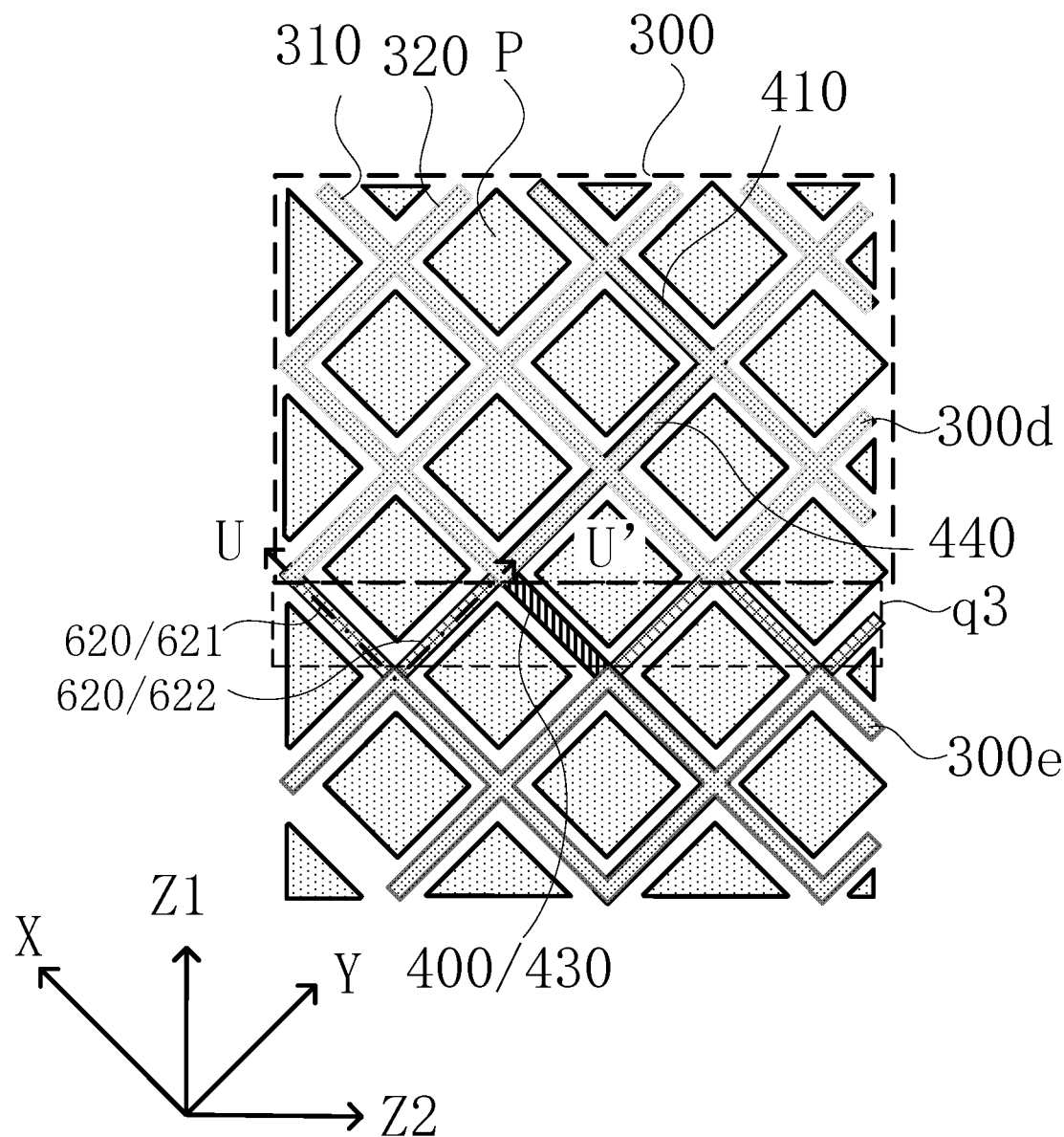
FIG. 35 illustrates another enlarged schematic diagram of part R in the touch display panel shown in FIG. 29, consistent with the disclosed embodiments of the present disclosure.
Figure 36:
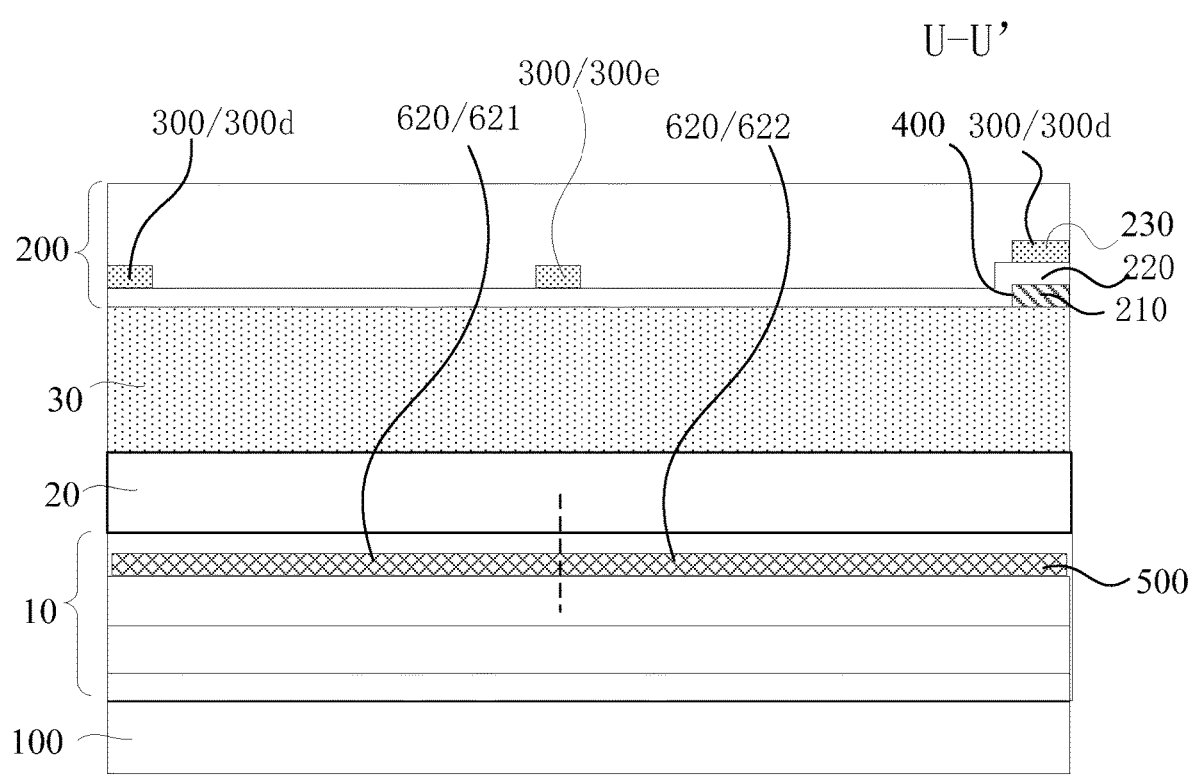
FIG. 36 illustrates a cross-sectional view along U-U' direction of the touch display panel shown in FIG. 35, consistent with the disclosed embodiments of the present disclosure.

FIG. 35 illustrates another enlarged schematic diagram of part R in a touch display panel shown in FIG. 29. FIG. 36 illustrates a cross-sectional view along U-U' direction of the touch display panel shown in FIG. 35. With reference to FIGS. 35 and 36, in some embodiments, the touch display panel may also include an array layer 10. The array layer 10 is located between the substrate 100 and the touch layer 20. The array layer 10 may include a third metal layer 500.

In the third direction Z1, a plurality of second dummy lines 620 is disposed between two adjacent touch electrodes 300d and 300e. The second dummy line 620 may include a first dummy portion 621 extending in the first direction X and a second dummy portion 622 extending in the second direction Y. Along the direction perpendicular to the plane where the substrate 100 is located, each of two ends of the first dummy portion 621 overlaps an adjacent touch electrode 300, respectively, and each of two ends of the second dummy portion 622 overlaps an adjacent touch electrode 300, respectively. The second dummy line 620 does not overlap the sub-pixel P. The second dummy line 620 is made of a metal material. The second dummy line 620 is disposed at the disconnection spacing between two adjacent touch electrodes 300d and 300e in the third direction Z1. Accordingly, a problem of a visible pattern of the touch electrode 300 due to the large distance between two adjacent touch electrodes 300d and 300e in the third direction Z1 may be addressed. Optionally, in the third direction Z1, the area where the touch lead 400 is arranged, between two adjacent touch electrodes 300d and 300e, may not be disposed with the second dummy line 620.

The second dummy line 620 is located in the third metal layer 500 of the array layer 10. An additional metal layer may not be need for forming the second dummy line 620. Accordingly, the thickness of the touch display panel may be reduced, the manufacturing process may be simplified, and the production cost may be reduced. Optionally, the third metal layer 500 may also be a source/drain metal layer, or other metal layers in the array layer 10.

In one embodiment, a plurality of second dummy lines 620 is disposed between the touch electrode 300d and the touch electrode 300e. In some other embodiments of the present disclosure, the second dummy line 620 may or may not be disposed between two adjacent touch electrodes 300 in the third direction Z1 in other positions in the touch display panel. That is, the second dummy line 620 may be disposed at each spacing between any two adjacent touch electrodes 300 along the third direction Z1 in the touch display panel, or the second dummy line 620 may be disposed at the spacings between any two adjacent touch electrodes 300 along the third direction Z1 in part of the touch display panel.

Figure 37:
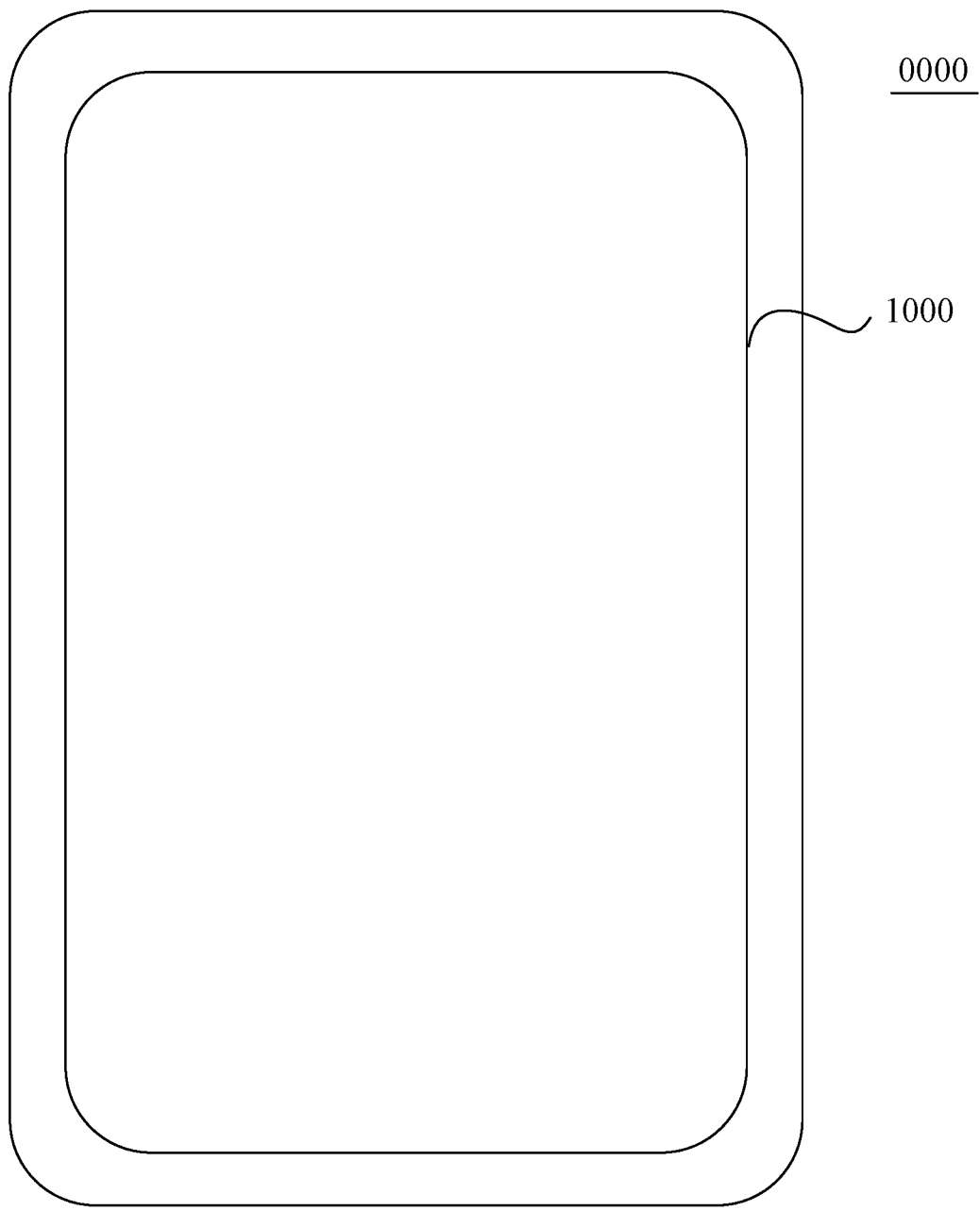
FIG. 37 illustrates a schematic top view of a display device consistent with the disclosed embodiments of the present disclosure.

FIG. 37 illustrates a schematic top view of a display device consistent with the disclosed embodiments of the present disclosure. With reference to FIG. 37, the present disclosure also provides a display device 0000. The display device 0000 may include a touch display panel 1000 provided in the present disclosure. FIG. 37 uses a mobile phone as an example to illustrate the display device 0000. It may be understood that the display device 0000 provided in present disclosure may also be a computer, a television, a vehicle-mounted display device, and other display devices 0000 having a display function, and is not specifically limited in the present disclosure. The display device 0000 provided by the present disclosure may have beneficial effects of the touch display panel 1000 provided by the present disclosure. For details, reference may be made to specific descriptions of the touch display panel 1000 in the present disclosure, and details are not described herein again.

As disclosed, the technical solutions of the present disclosure have the following advantages.

The touch display panel provided by the present disclosure may include a plurality of touch electrodes and a plurality of touch leads. The touch electrode may include a first electrode line extending in a first direction and a second electrode line extending in a second direction. The first direction intersects the second direction. The touch electrode may be a grid structure formed by a plurality of first electrode lines and a plurality of second electrode lines. The touch lead may include a first wiring portion extending along the first direction. The first electrode line and the first wiring portion each extend along the first direction. The first electrode line is located on a second metal layer. The first wiring portion is at least partially located on a first metal layer. Along a direction perpendicular to a plane where the substrate is located, the first wiring portion and the first electrode line at least partially overlap. A part of the first wiring portion located in the first metal layer at least partially overlaps the first electrode line. Since along the direction perpendicular to the plane where the substrate is located, the first wiring portion and the first electrode line at least partially overlap, shielding of the light exited from the touch display panel by disposing the touch leads in the touch display panel may be reduced, and influence on the display effect of the touch display panel may be reduced. In addition, since the touch lead is made of metal, the touch lead may have reflective characteristics. Along the direction perpendicular to the plane where the substrate is located, the first wiring portion and the first electrode line at least partially overlap. A problem of a visible pattern of the touch lead caused by disposing the touch lead 400 in the touch display panel may be alleviated.

The embodiments disclosed herein are exemplary only and not limiting the scope of the present disclosure. Various combinations, alternations, modifications, equivalents, or improvements to the technical solutions of the disclosed embodiments can be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A touch display panel, comprising:
   a substrate;
   a touch layer located on a side of the substrate, wherein the touch layer comprises a first metal layer, an insulation layer, and a second metal layer stacked in sequence;
   a plurality of touch electrodes located in the second metal layer, wherein a touch electrode of the plurality of touch electrodes comprises a first electrode line extending along a first direction and a second electrode line extending along the second direction, and the first direction intersects the second direction; and
   a plurality of touch leads, wherein the touch electrode is electrically connected to a corresponding touch lead of the plurality of touch leads,
   wherein:
   the touch lead comprises a first wiring portion extending along the first direction;
   along a direction perpendicular to a plane where the substrate is located, the first wiring portion and the first electrode line at least partially overlap;
   the first wiring portion is at least partially located in the first metal layer;
   the touch lead comprises a second touch lead, and the second touch lead is located in the first metal layer;
   the touch electrode comprises one or more second touch electrodes, wherein one second touch electrode comprises at least two adjacent first electrode lines arranged along the first direction, and a first interval is located between the two adjacent first electrode lines, wherein the two adjacent first electrode lines along the first direction means that there is no other first electrode line between the two adjacent first electrode lines along the first direction; and
   along the direction perpendicular to the plane where the substrate is located, the first wiring portion of the second touch lead overlaps the first interval.

2. The touch display panel according to claim 1, wherein:
   the first metal layer is located on a side of the insulation layer adjacent to the substrate;
   the touch lead comprises a first touch lead, wherein the first touch lead is located in the first metal layer; and
   the touch electrode comprises a first touch electrode located in a first area, wherein, in the first area, along the direction perpendicular to the plane where the substrate is located, the first electrode line of the first touch electrode covers the first wiring portion of the first touch lead.

3. The touch display panel according to claim 1, wherein:
   the touch lead comprises a third touch lead; and
   the first wiring portion of the third touch lead is partially located in the second metal layer.

4. The touch display panel according to claim 3, wherein:
   the first metal layer is located on a side of the insulation layer close to the substrate; and
   a width of the touch lead is greater than or equal to a width of the first electrode line.

5. The touch display panel according to claim 3, wherein:
   the first wiring portion of the third touch lead comprises a first sub-portion and a second sub-portion that are electrically connected, wherein the first sub-portion is located in the first metal layer, and the second sub-portion is located in the second metal layer;
   the touch electrode comprises one or more third touch electrodes, wherein one third touch electrode comprises at least two adjacent second electrode lines arranged along the second direction, and a second interval is located between the two adjacent second electrode lines;
   along the direction perpendicular to the plane where the substrate is located, the second sub-portion overlaps the second interval, and the second sub-portion and the third touch electrode do not overlap; and
   along the direction perpendicular to the plane where the substrate is located, the third touch electrode partially overlaps the first sub-portion.

6. The touch display panel according to claim 5, wherein:
   along the direction perpendicular to the plane where the substrate is located, in at least one third touch electrode, only one electrode line overlaps the first sub-portion.

7. The touch display panel according to claim 3, further comprising at least one bending area, wherein:
   a portion of the touch display panel located in the at least one bending area is bendable, and the at least one bending area comprises the third touch lead.

8. The touch display panel according to claim 3, further comprising a display area, wherein:
   the display area comprises a first display area;
   the first display area is bendable toward a direction away from a light exiting side of the touch display panel; and
   the first display area comprises the third touch lead.

9. The touch display panel according to claim 1, further comprising a plurality of sub-pixels, wherein:
   in the touch electrode, a plurality of the first electrode lines and a plurality of the second electrode lines intersect, defining a plurality of meshes;
   a vertical projection of at least one mesh of the plurality of meshes on the substrate surrounds a vertical projection of at least one sub-pixel of the plurality of sub-pixels on the substrate; and along the direction perpendicular to the plane where the substrate is located, the touch lead does not overlap the plurality of sub-pixels.

10. The touch display panel according to claim 9, wherein:

the touch electrodes are arranged in an array along the first direction and the second direction;

in the first direction, a gap between two adjacent touch electrodes arranged along the first direction has a length of d1;

in the first direction, the sub-pixel located between the two adjacent touch electrodes arranged along the first direction has a length of d2; and in the first direction, a distance between two sub-pixels adjacent to the sub-pixel located between the two adjacent touch electrodes arranged along the first direction is d3, wherein: $d2 \leq d1 \leq d3$.

11. The touch display panel according to claim 10, wherein:

the touch display panel further comprises an array layer, wherein the array layer is located between the substrate and the touch layer, and the array layer comprises a third metal layer;

in the first direction, a plurality of first dummy lines is disposed between the two adjacent touch electrodes, wherein a first dummy line of the plurality of first dummy lines extends along the first direction;

along the direction perpendicular to the plane where the substrate is located, each of two ends of the first dummy line overlaps an adjacent touch electrode, respectively;

the first dummy line does not overlap the sub-pixel; and the first dummy line is located in the third metal layer.

12. The touch display panel according to claim 9, wherein:

the touch electrodes are arranged in an array along the first direction and the second direction;

the touch lead comprises a first branch and a second branch connected to each other, wherein the second branch is connected between two adjacent first branches along the first direction, and the second branch is located in a gap between the two adjacent touch electrodes arranged along the first direction;

along the direction perpendicular to the plane where the substrate is located, the second branch and the touch electrode do not overlap;

the second branch comprises two first segments connected to different first branches, and a second segment connected to the two first segments, wherein one end of the first segment is connected to the second segment, and an other end of the first segment is connected to the first branch;

the second segment extends along the first direction, and the first segment extends along the second direction; and a vertical projection of the second branch on the substrate at least partially surrounds a vertical projection of the sub-pixel on the substrate.

13. The touch display panel according to claim 12, further comprising a plurality of sub-pixel rows arranged along the first direction, wherein:

a sub-pixel row of the plurality of sub-pixel rows comprises a plurality of sub-pixels arranged along the second direction;

the sub-pixel row comprises a first sub-pixel row and a second sub-pixel row, wherein along the first direction, the first sub-pixel row and the second sub-pixel row are arranged at an interval; and in the first direction, one sub-pixel of the plurality of sub-pixels in the first sub-pixel row overlaps two adjacent sub-pixels in the plurality of sub-pixels in the second sub-pixel row.

14. The touch display panel according to claim 9, wherein:

the touch electrodes are arranged in an array along a third direction and a fourth direction, wherein the third direction intersects the fourth direction, the third direction intersects each of the first direction and the second direction, and the fourth direction intersects each of the first direction and the second direction; and the touch lead further comprises a second wiring portion extending along the second direction, wherein along the direction perpendicular to the plane where the substrate is located, the second wiring portion and the second electrode line at least partially overlap.

15. The touch display panel according to claim 14, wherein:

the touch lead comprises a second branch, wherein the second branch is located in a gap between two adjacent touch electrodes arranged along the third direction, and the second branch extends along the first direction;

in the first direction, the second branch has a length of m1;

in the first direction, the sub-pixel located between the two adjacent touch electrodes arranged along the third direction has a length of m2; and in the first direction, a distance between two sub-pixels adjacent to the sub-pixel located between the two adjacent touch electrodes arranged along the third direction is m3, wherein: $m2 \leq m1 \leq m3$.

16. The touch display panel according to claim 14, wherein:

the touch lead comprises a second branch, wherein the second branch is located in a gap between two adjacent touch electrodes arranged along the third direction, and the second branch extends along the second direction;

in the second direction, the second branch has a length of n1;

in the second direction, the sub-pixel located between the two adjacent touch electrodes arranged along the third direction has a length of n2; and in the second direction, a distance between two sub-pixels adjacent to the sub-pixel located between the two adjacent touch electrodes arranged along the third direction is n3, wherein: $n2 \leq n1 \leq n3$.

17. The touch display panel according to claim 14, wherein:

the touch lead comprises a second branch, wherein the second branch is located in a gap between two adjacent touch electrodes arranged along the third direction, the second branch comprise a third segment extending along the first direction, and a fourth segment extending along the second direction;

in the first direction, the third segment has a length of H1;

in the first direction, the sub-pixel between the two adjacent touch electrodes arranged along the third direction has a length of h1;

in the first direction, a distance between two sub-pixels adjacent to the sub-pixel located between the two adjacent touch electrodes arranged along the third direction is h2;

in the second direction, the fourth segment has a length of H2;

in the second direction, the sub-pixel located between the two adjacent touch electrodes arranged along the third direction has a length of h3; and in the second direction, a distance between two sub-pixels adjacent to the sub-pixel located between the two adjacent touch electrodes arranged along the third direction is h4, wherein: $(h1)/2 \leq H1 \leq (h2)/2$, and $(h3)/2 \leq H2 \leq (h4)/2$.

18. The touch display panel according to claim 14, wherein:

the touch display panel further comprises an array layer, wherein the array layer is located between the substrate and the touch layer, and the array layer comprises a third metal layer;

in the third direction, a plurality of second dummy lines is disposed between two adjacent touch electrodes, wherein a second dummy line of the plurality of second dummy lines comprises a first dummy portion extending along the first direction and a second dummy portion extending along the second direction;

along the direction perpendicular to the plane where the substrate is located, each of two ends of the first dummy portion overlaps an adjacent touch electrode, respectively, and each of two ends of the second dummy portion overlaps an adjacent touch electrode, respectively;

the second dummy line does not overlap the sub-pixel; and the second dummy line is located in the third metal layer.

19. A display device, comprising a touch display panel, wherein the touch display panel comprises:

a substrate;

a touch layer located on a side of the substrate, wherein the touch layer comprises a first metal layer, an insulation layer, and a second metal layer stacked in sequence;

a plurality of touch electrodes located in the second metal layer, wherein a touch electrode of the plurality of touch electrodes comprises a first electrode line extending along a first direction and a second electrode line extending along the second direction, and the first direction intersects the second direction; and a plurality of touch leads, wherein the touch electrode is electrically connected to a corresponding touch lead of the plurality of touch leads, wherein:

the touch lead comprises a first wiring portion extending along the first direction;

along a direction perpendicular to a plane where the substrate is located, the first wiring portion and the first electrode line at least partially overlap;

the first wiring portion is at least partially located in the first metal layer;

the touch lead comprises a second touch lead, and the second touch lead is located in the first metal layer;

the touch electrode comprises one or more second touch electrodes, wherein one second touch electrode comprises at least two adjacent first electrode lines arranged along the first direction, and a first interval is located between the two adjacent first electrode lines, wherein the two adjacent first electrode lines along the first direction means that there is no other first electrode line between the two adjacent first electrode lines along the first direction; and along the direction perpendicular to the plane where the substrate is located, the first wiring portion of the second touch lead overlaps the first interval.

* * * * *